United States Patent
Tsujii

(10) Patent No.: US 8,630,019 B2
(45) Date of Patent: Jan. 14, 2014

(54) IMAGE PROCESSING APPARATUS, METHOD OF CONTROLLING THE IMAGE PROCESSING APPARATUS, AND STORAGE MEDIUM

(75) Inventor: Takaya Tsujii, Tokyo (JP)

(73) Assignee: Canon Kabushiki Kaisha (JP)

( * ) Notice: Subject to any disclaimer, the term of this patent is extended or adjusted under 35 U.S.C. 154(b) by 824 days.

(21) Appl. No.: 12/483,340

(22) Filed: Jun. 12, 2009

(65) Prior Publication Data

US 2009/0316170 A1 Dec. 24, 2009

(30) Foreign Application Priority Data

Jun. 18, 2008 (JP) ................................. 2008-159158

(51) Int. Cl.
- *G06K 15/00* (2006.01)
- *G06K 9/40* (2006.01)
- *G06K 9/38* (2006.01)

(52) U.S. Cl.
USPC ......... 358/1.9; 358/3.06; 358/3.27; 358/3.28; 382/270; 382/254; 382/266; 382/274; 382/275

(58) Field of Classification Search
USPC ........ 358/3.1, 1.15, 1.2, 1.9, 3.06, 3.27, 3.28; 707/203; 382/270, 254, 266, 274, 275
See application file for complete search history.

(56) References Cited

U.S. PATENT DOCUMENTS

| | | | | |
|---|---|---|---|---|
| 5,197,765 A * | 3/1993 | Mowry et al. | ................... | 283/93 |
| 5,788,285 A * | 8/1998 | Wicker | ............................ | 283/93 |
| 6,278,486 B1 * | 8/2001 | Hieda et al. | ................... | 348/239 |
| 7,236,734 B2 * | 6/2007 | Ng et al. | ....................... | 399/341 |
| 7,366,301 B2 * | 4/2008 | Huang et al. | .................... | 380/51 |
| 7,436,552 B2 * | 10/2008 | Nozato | ......................... | 358/406 |
| 7,463,389 B2 * | 12/2008 | Ohno | ............................ | 358/3.28 |
| 7,499,196 B2 * | 3/2009 | Nakata et al. | .................. | 358/2.1 |
| 7,509,060 B2 * | 3/2009 | Yaguchi et al. | ................. | 399/15 |
| 7,639,400 B2 * | 12/2009 | Hains | .......................... | 358/3.06 |
| 7,755,776 B2 * | 7/2010 | Makino et al. | ................ | 356/630 |
| 8,040,572 B2 * | 10/2011 | Mikami | ....................... | 358/3.28 |
| 2006/0119887 A1 * | 6/2006 | Aritomi et al. | .............. | 358/1.15 |

(Continued)

FOREIGN PATENT DOCUMENTS

| JP | 10-55085 A | 2/1998 |
|---|---|---|
| JP | 2004-280227 A | 10/2004 |

(Continued)

OTHER PUBLICATIONS

Office Action issued in corresponding Korean Patent Application No. 10-2009-0053860 dated Dec. 13, 2010.

(Continued)

*Primary Examiner* — Akwasi M Sarpong

(74) *Attorney, Agent, or Firm* — Rossi, Kimms & McDowell LLP

(57) ABSTRACT

An image processing apparatus which makes it possible to prevent a third party from outputting secret information as an image without leaving any evidence. A printer section of the image processing apparatus receives first image data and attribute data. The printer section forms an image corresponding to the first image data on a sheet, and then forms an image of information of the attribute data on the sheet in a manner superimposed on the image. A controller of the image processing apparatus generates second image data from the attribute data, and performs control such that the first image data and the second image data are recorded as history information on a job processed by the image processing apparatus.

9 Claims, 20 Drawing Sheets

(56) References Cited

U.S. PATENT DOCUMENTS

| | | | |
|---|---|---|---|
| 2007/0065208 A1* | 3/2007 | Uchida et al. | 400/76 |
| 2007/0266057 A1* | 11/2007 | Utsumi | 707/203 |
| 2010/0166337 A1* | 7/2010 | Murashita et al. | 382/284 |
| 2012/0075671 A1* | 3/2012 | Ogawa et al. | 358/1.15 |

FOREIGN PATENT DOCUMENTS

| | | | |
|---|---|---|---|
| JP | 2006-092363 A | | 4/2006 |
| JP | 2007-088603 A | | 4/2007 |
| JP | 2007-304861 A | | 11/2007 |
| KR | 10-2003-0093610 A | | 12/2003 |

OTHER PUBLICATIONS

Partial European Search Report for corresponding EP 09163011.1, mail date Sep. 4, 2012.

Japanese Office Action for corresponding JP 2008-159158, mail date Aug. 21, 2012.

* cited by examiner

FIG. 12

| CLEAR-TONER IMAGE INFORMATION | | | | |
|---|---|---|---|---|
| CLEAR-TONER PRINTING | | | | PERFORM/NOT PERFORM — 1201 |
| | FULL-SURFACE PRINTING | | | PERFORM/NOT PERFORM — 1202 |
| | PARTIAL PRINTING | SUPERIMPOSITION | | SUPERIMPOSE/NOT SUPERIMPOSE — 1203 |
| | | CHARACTER STRING PRINTING | | PRINT/NOT PRINT — 1204 |
| | | CHARACTER STRING | | Confidential — 1205 |
| | | POINT | | 24 POINT — 1206 |
| | | FONT | | MINCHO — 1207 |
| | | INCLINATION | | 30 DEGREES — 1208 |
| | | FILE DESIGNATION | | DESIGNATE/NOT DESIGNATE — 1209 |
| | | FILE PATH | | C:¥Documents¥abc.txt — 1210 |

FIG. 15

|  | TAG NAME | ITEM | EXAMPLE 1 |
|---|---|---|---|
| 1501 | JobKind | JOB KIND | PDL-PRINT |
| 1502 | JobName | JOB NAME | Word-Document |
| 1503 | ClientName | JOB CLIENT | SUZUKI Hajime |
| 1504 | CharacterCode | CHARACTER CODE INFORMATION | Shift_JIS |
| 1505 | SectionNo | SECTION CODE | 1504 |
| 1506 | StartTime | JOB START TIME (COMMUNICATION START TIME) | 2007/10/15 08:05:40 |
| 1507 | EndTime | JOB END TIME (COMMUNICATION END TIME) | 2007/10/15 08:10:30 |
| 1508 | Result | JOB END RESULT | OK |
| 1509 | ResourceCount | SHEET COUNT PER COPY | 10 |
| 1510 | Copies | COPY COUNT | 5 |

FIG. 19
MODE SELECTION
   RECORD SYNTHESIZED IMAGE   1901
   RECORD SEPARATE IMAGES   1902

IMAGE PROCESSING APPARATUS, METHOD OF CONTROLLING THE IMAGE PROCESSING APPARATUS, AND STORAGE MEDIUM

BACKGROUND OF THE INVENTION

1. Field of the Invention

The present invention relates to an image processing apparatus applied to a case of recording image data for use in forming images on sheets, as history information, a method of controlling the image processing apparatus, and a computer-readable storage medium storing a program for implementing the method.

2. Description of the Related Art

Recently, not only the full-color printing method in which electrophotographic printing is performed using four color toners (cyan (C), magenta (M), yellow (Y), and black (B)), but also a multi-color printing method additionally using a special toner has attracted attention.

A bill/check centralized issuing system for financial institutions is known as a special toner-using printing method which has already become commercially available. This is a method in which an image is formed using clear toner on a sheet having an image formed thereon by the general electrophotographic printing method. According to this method, information for certifying that a printout is an original is printed, which makes it possible to visualize normally invisible printed information by ultraviolet radiation to thereby show that the printout is not a replica produced by forgery or copying.

Although in the above-mentioned example, a clear-toner layer is superimposed on a monochrome printout, the use of clear toner makes it possible to provide the same advantageous effects for color printing as well. As far as color printing is concerned, there has also been proposed a technique which makes it possible to control the glossiness of a print surface using clear toner (see e.g. Japanese Patent Laid-Open Publication No. H10-55085).

To print a clear-toner image on an ordinary image in superimposed relation, there is employed the following known technique: Before rasterizing a form image by an image processing apparatus for printing, and printing the form image on a to-be-printed image, in superimposed relation, a computer generates information for activating the function of applying clear toner onto the form image alone in superimposed relation and information on positions where the clear toner is to be superimposed. Thereafter, the generated information is converted into PDL (Page Description Language) data as attribute data together with the to-be-printed image data, and is sent to the image processing apparatus. The image processing apparatus prints the to-be-printed image on a sheet using color toners and at the same time superimposingly prints a clear-toner image on the printed print image according to the attribute data.

On the other hand, with widespread use of image processing apparatuses, anyone can easily print various information or copy originals using an image processing apparatus. However, there is a fear that improvement in user-friendliness of image processing apparatuses in printing and copying might increase possibility of information leakage (printing or copying of secret information).

To prevent information leakage, there is provided a function of accumulating all image data printed or read from originals in a recording device whenever printing or copying is performed by each image processing apparatus, and recording a job history storing pieces of information each indicative of what kind of processing was carried out by whom, and when and where. This function is advantageous in that an administrator can make use of the function to check on the accumulated image data to thereby investigate and trace afterwards which image processing apparatus processed leaked information and an associated original.

However, the above-described conventional technique of superimposingly printing a clear-toner image on an ordinary image suffers from the following problems:

When the image processing apparatus receives clear-toner attribute data as position information indicative of where to apply clear toner, together with data of a to-be-printed image, from the computer, it performs control such that clear toner is applied based on the attribute data. In this case, the attribute data cannot be synthesized as image data with to-be-printed image data. The to-be-printed image data is formed on a sheet using toner, whereafter clear-toner image is superimposed on a predetermined portion of the toner image based on the attribute data.

On the other hand, in a case where printing is performed based on image data while using the function of generating image data for job history and recording the generated data in a recording device for security, the image data is stored as job history information. However, the clear-toner attribute data, which is not image data, is not stored as job history information.

SUMMARY OF THE INVENTION

The present invention provides an image processing apparatus which makes it possible to prevent a third party from outputting secret information as an image without leaving any evidence, a method of controlling the image processing apparatus, and a computer-readable storage medium storing a program for implementing the method.

In a first aspect of the present invention, there is provided an image processing apparatus comprising an image forming unit adapted to be capable of receiving first image data and attribute data, forming an image corresponding to the first image data on a transfer material, and forming an image of information indicated by the attribute data on the transfer material in a manner superimposed on the image, a generation unit adapted to generate second image data from the attribute data, and a control unit adapted to perform control such that the first image data and the second image data are recorded as history information on a job processed by the image processing apparatus.

In a second aspect of the present invention, there is provided a method of controlling an image processing apparatus, comprising receiving at the image processing apparatus first image data and attribute data input, forming second image data from the attribute data, forming an image corresponding to the first image data on a transfer material and forming an image of information indicated by the attribute data on the transfer material in a manner superimposed on the image, and performing control such that the first image data and the second image data are recorded as history information on a job processed by the image processing apparatus.

In a third aspect of the present invention, there is provided a computer-readable storage medium storing a program for causing a computer to execute a method of controlling an image processing apparatus, wherein the method comprises receiving at the image processing apparatus first image data and attribute data input, forming second image data from the attribute data, forming an image corresponding to the first image data on a transfer material and forming an image of information indicated by the attribute data on the transfer material in a manner superimposed on the image, and performing control such that the first image data and the second image data are recorded as history information on a job processed by the image processing apparatus.

According to the present invention, the first image data and the second image data generated based on the attribute data are synthesized, and the synthesized image data is recorded as job history information on a job processed by the image processing apparatus. Therefore, the attribute data can be recorded as job history information, as the image data is. This makes it possible to prevent a third party from sending secret information as clear-toner attribute data to the image processing apparatus, and outputting the secret information as an image without leaving any evidence.

The features and advantages of the invention will become more apparent from the following detailed description taken in conjunction with the accompanying drawings.

BRIEF DESCRIPTION OF THE DRAWINGS

FIG. 12 is a diagram of the data structure of clear-toner image information.

FIG. 15 is a diagram of an example of a history record stored in the storage server.

FIG. 19 is a view of a configuration screen of an image processing apparatus according to a second embodiment of the present invention, as a user interface for specifying whether or not to perform synthesis of image data for recording.

DETAILED DESCRIPTION OF THE EMBODIMENTS

The present invention will now be described in detail below with reference to the accompanying drawings showing embodiments thereof.

First of all, a description will be given of a basic configuration of a system for realizing the function of an image processing apparatus, for recording pieces of job history information each indicative of what kind of processing was carried out on image data by whom, and when and where, prior to detailed description of an image processing apparatus according to a first embodiment of the present invention.

Figure 1:
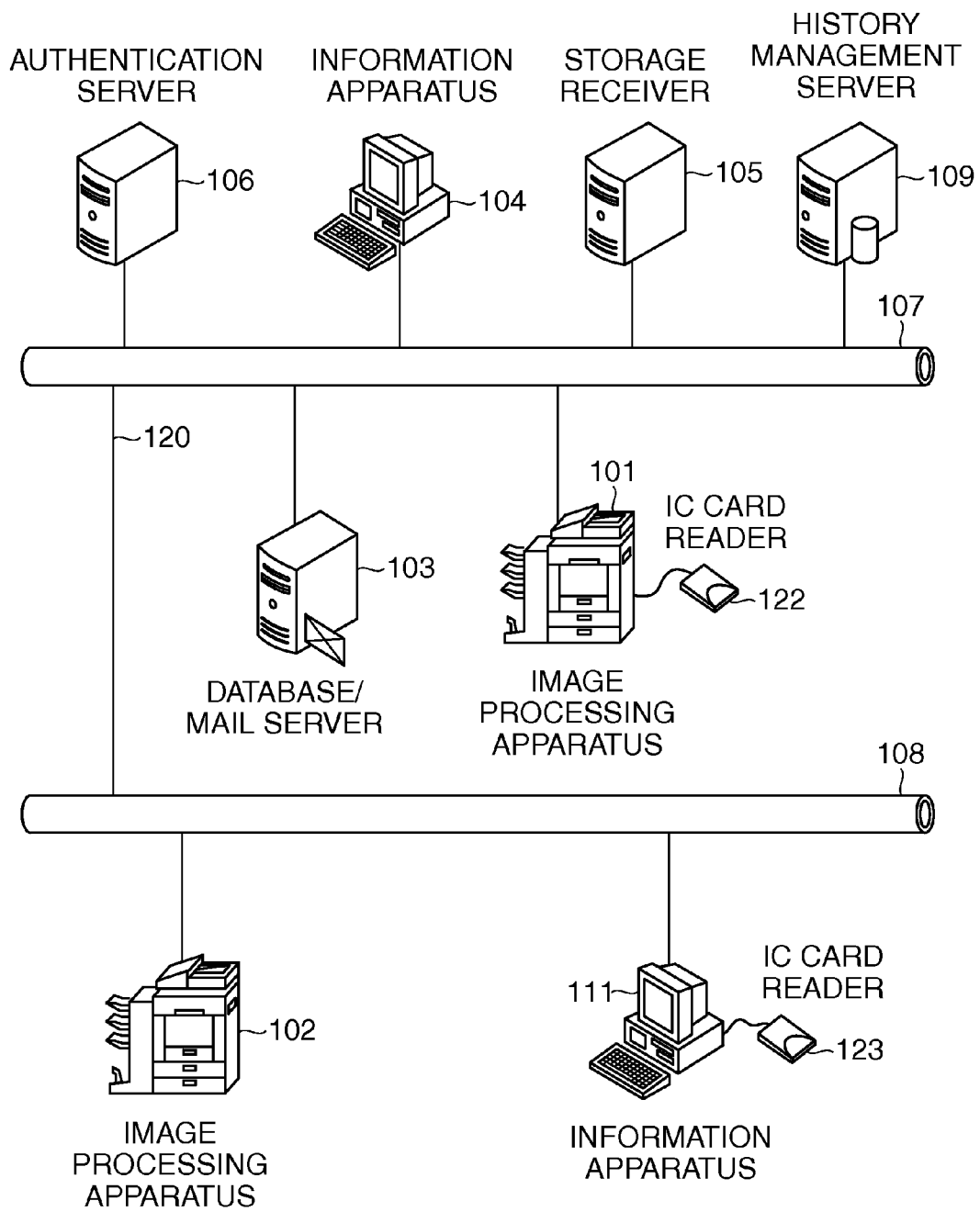
FIG. 1 is a schematic diagram of a basic system configuration for realizing a function of recording job history information in an image processing apparatus.

FIG. 1 is a schematic diagram of the basic system configuration for realizing the function of recording job history information in the image processing apparatus according to the present embodiment.

As shown in FIG. 1, the present system is formed by interconnecting image processing apparatuses 101 and 102, a database/mail server 103, information apparatuses 104 and 111, a storage server 105, a history management server 109, and an authentication server 106, via a network.

In the present system, when each of the image processing apparatuses 101 and 102 performs printing or copying, it accumulates all printed image data and all image data read from an original in the storage server 105. This realizes the function of the image processing apparatus, for recording job history information indicative of what kind of processing was carried out on image data by whom, and when and where is realized.

In the case of executing a print job, a copy job or the like by the image processing apparatus 101, the user inserts an IC card of the user's own into an IC card reader 122 connected to the image processing apparatus 101, whereby user authentication is made possible. This user authentication makes it possible to identify the user who carried out the print job, the copy job or the like.

The database/mail server 103 is a computer on which operates an application server for storing data read from originals by the image processing apparatus 101. The authentication server 106 performs user authentication. The information apparatus 104 is a computer connected to the database/mail server 103 to download data from the database/mail server 103 and display the downloaded data. The information apparatus 104 is capable of giving a necessary print instruction to the image processing apparatus 101.

In a case where the information apparatus 104 causes the image processing apparatus 101 to perform printing, the user's name and password entered via a keyboard of the information apparatus 104 are delivered to the authentication server 106, and the authentication server 106 executes user authentication. When the user authentication is completed, the image processing apparatus 101 is enabled to perform print processing.

The storage server 105 is an audit storage device for recording and accumulating all image data input and output by the image processing apparatus 101, together with detailed information on an associated job. The storage server 105 records and manages the detailed job information as a history record (job history event). The history management server 109 compiles data stored in the storage server 105.

Under an environment where a plurality of image processing apparatuses and storage servers exist, centralized management of data recorded for security is made possible by installation of the history management server 109. Further, when the history management server 109 performs OCR (Optical Character Reader) processing on an image and detects any of specific keywords, it is judged that there is a fear of information leakage. In this case, it is possible to notify a system administrator of the fact by e-mail.

The image processing apparatus 102 has a function equivalent to that of the storage server 105 incorporated therein. More specifically, the image processing apparatus 102 is provided with an audit storage device for recording and accumulating all image data input and output by the image processing apparatus 102, together with detailed information on an associated job. The information apparatus 111 is connected to the image processing apparatus 102 to give a printout instruction and an Internet FAX (hereinafter abbreviated as "IFAX") instruction to the image processing apparatus 102. In the case of executing a print job, an IFAX job or the like by the image processing apparatus 102, a user inserts an IC card of the user's own into an IC card reader 123 connected to the image processing apparatus 111, whereby user authentication is made possible.

An Ethernet (registered trademark) 107 is a network to which are connected the image processing apparatus 101, the database/mail server 103, the information apparatus 104, the storage server 105, and the history management server 109. Further, an Ethernet (registered trademark) 108 is a network to which are connected the image processing apparatus 102 and the information apparatus 111. The Ethernet (registered trademark) 107 and the Ethernet (registered trademark) 108 are interconnected via a WAN (Wide Area Network) 120. The network is not limited to the configuration shown in FIG. 1.

Next, the image processing apparatus 101 according to the first embodiment will be described in detail with reference to FIGS. 2 and 3.

Figure 2:
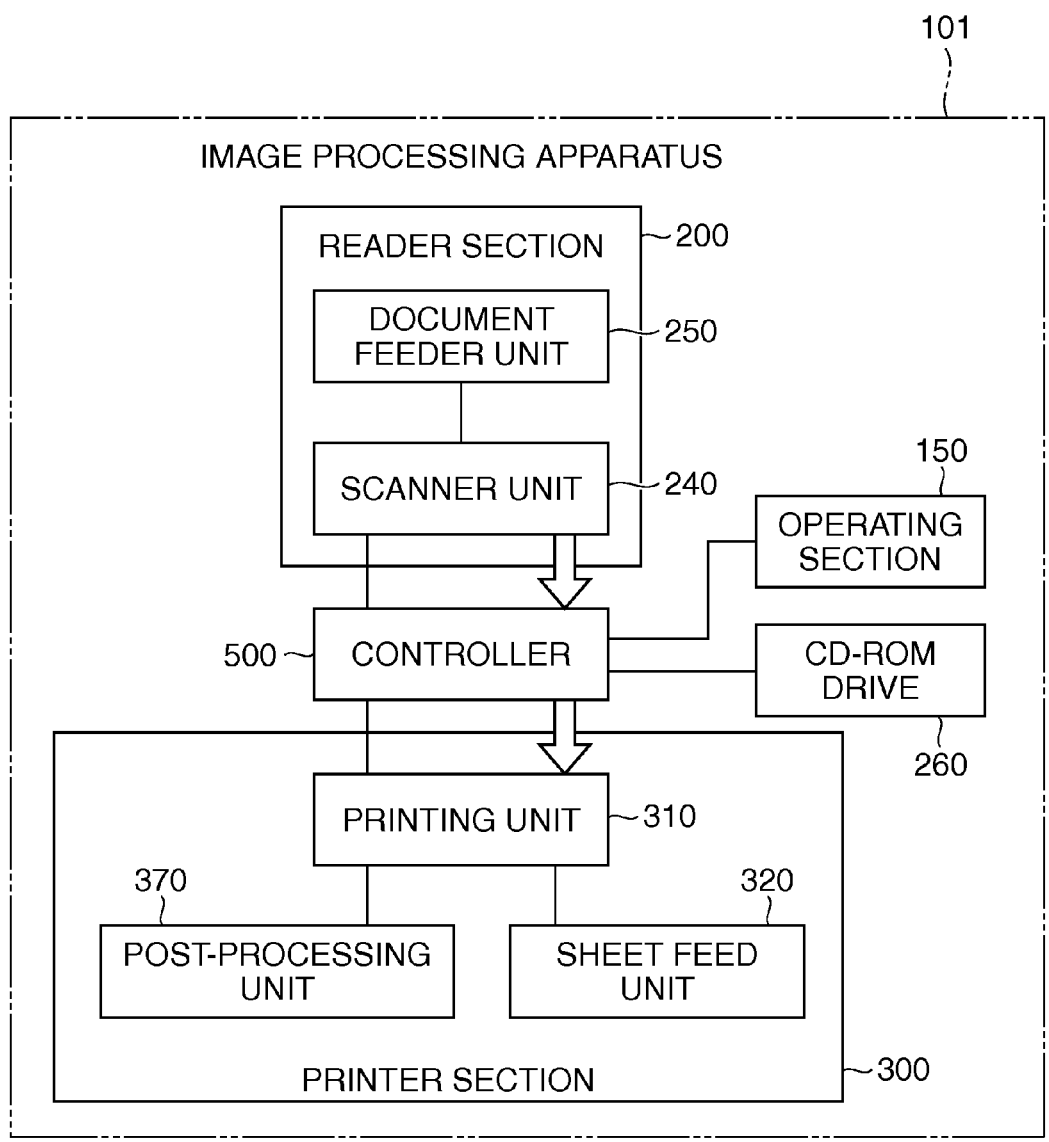
FIG. 2 is a block diagram of an image processing apparatus according to a first embodiment of the present invention.

FIG. 2 is a block diagram of the image processing apparatus 101.

As shown in FIG. 2, the image processing apparatus 101 is comprised of a controller 500, a reader section (image input section) 200, a printer section (image output section) 300, an operating section 150, and a CD-ROM drive 260. The image processing apparatus 101 is a multifunction machine equipped with an original reading function, a printing function, and a communication function.

The reader section 200 is comprised of a scanner unit 240, and a document feed unit 250. The scanner unit 240 has a function for reading originals and includes a CCD 210 described hereinafter. The document feed unit 250 has a function for conveying originals set therein onto an original platen glass 203 (see FIG. 3). The reader section 200 optically reads an image from an original conveyed by the document feed unit 250, and converts the image into image data.

The printer section 300 (image forming unit) is comprised of a printing unit 310, a sheet feed unit 320, and a post-processing unit 370. The printing unit 310 has a printing function for transferring and fixing an image on a sheet. The sheet feed unit 320 is comprised of a plurality of kinds of sheet cassettes, and feeds sheets into the printing unit 310. The post-processing unit 370 has a function for performing post-processing (sorting, stapling, etc.) on printed sheets and discharging the processed sheets out of the apparatus. In short, the printer section 300 causes the printing unit 310 to print image data as a visualized image on each sheet conveyed by the sheet feed unit 320, and causes the post-processing unit 370 to discharge the sheets out of the apparatus.

The controller 500 is electrically connected to the reader section 200 and the printer section 300. The controller 500 controls the reader section 200 to provide the original reading function for reading an image from an original, and controls the printer section 300 to provide the printing function for forming an image on a sheet. Further, the controller 500 is capable of reading data stored in a CD-ROM via the CD-ROM drive 260. The operation section 150 includes a liquid crystal display and a touch panel input section, and provides user interface (hereinafter abbreviated as "I/F") for operating the devices of the image processing apparatus under the control of the controller 500.

Figure 3:
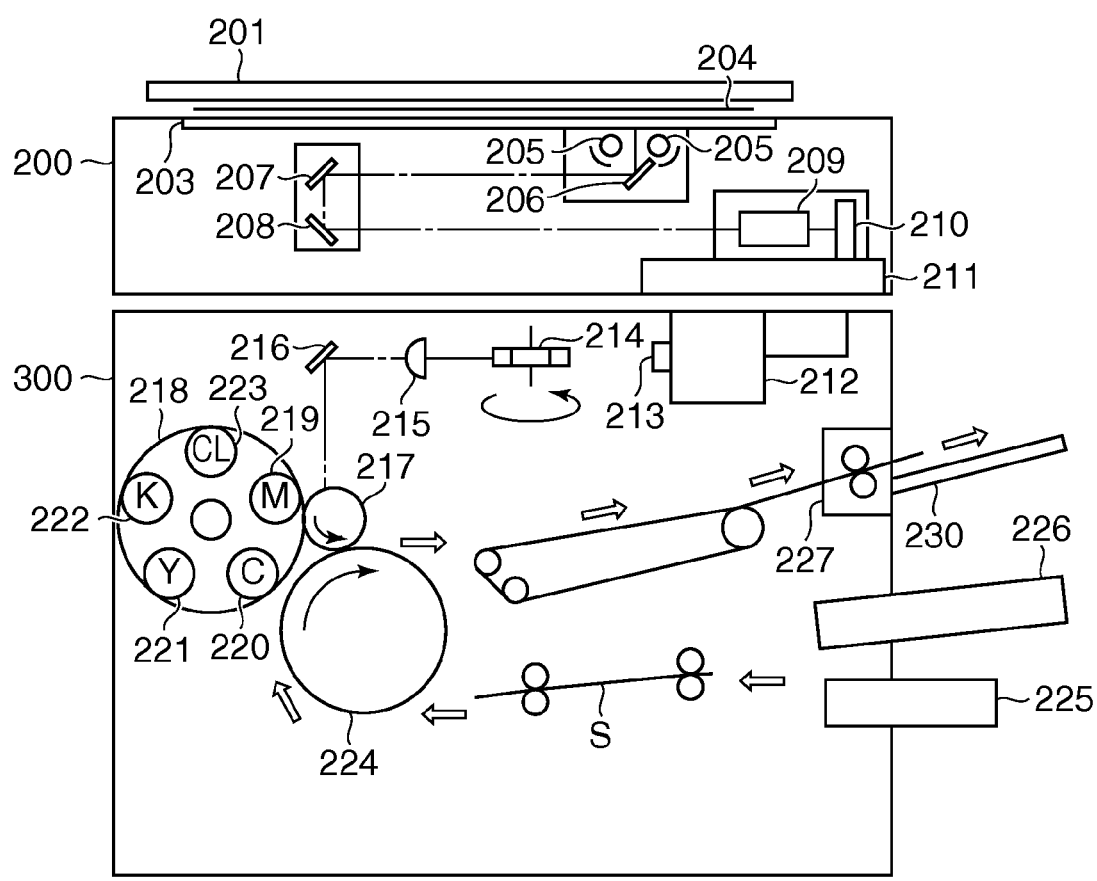
FIG. 3 is a view showing the internal construction of the image processing apparatus.

FIG. 3 is a view showing the internal construction of the image processing apparatus.

Referring to FIG. 3, the reader section 200 is configured to read an image from an original and perform digital signal processing on the image. The printer section 300 is configured to print an image corresponding to the original image read by the reader section 200, in full color.

In the reader section 200, an original 204 placed on the original platen glass (hereinafter simply referred to as "the platen glass") 203 via a mirror-surface pressure plate 201 is irradiated with light from a lamp 205. A reflected light from the original is guided by mirrors 206, 207, and 208 to pass through a lens 209 to form an image on a 3-line solid-state imaging device sensor (hereinafter referred to as "the CCD") 210. The reflected light from the original is photoelectrically converted by the CCD 210, and three red (R), green (G), and blue (B) image signals as full-color information are sent to a reader image processor 211.

An optical unit including the lamp 205 and the mirror 206 and an optical unit including the mirrors 207 and 208 are mechanically driven by a drive mechanism to move at a velocity of v and a velocity of ½v, respectively, in a direction orthogonal to an electrical scanning direction (main scanning direction) of the CCD 210, whereby the entire surface of the original 204 is scanned (sub-scanned). In the present example, the original 204 is read e.g. at a resolution of 600 dpi (dots/inch) in both the main scanning direction and the sub scanning direction by the reader section 200.

Read image signals (scan image signals) are accumulated in a data storage within the reader image processor 211 in units of one original page. An image signal input to the reader image processor 211 is subjected to predetermined processing to be output to the controller 500. The image signal input to the controller 500 is electrically processed on a pixel-by-pixel basis to be separated into components of magenta (M), cyan (C), yellow (Y), and black (K) and sent to the printer section 300 together with a clear-toner signal (CL).

In the printer section 300, a laser driver 212 modulation-drives a semiconductor laser 213 according to the image signals (M, C, Y, and K) and the clear-toner signal (CL) delivered from the controller 500. A laser beam emitted from the semiconductor laser 213 scans the surface of a photosensitive drum 217 via a polygon mirror 214, an f-θ lens 215, and a mirror 216. Thus, an electrostatic latent image is formed on the photosensitive drum 217 at the same resolution of 600 dpi (dots/inch) in both the main and sub scanning directions as in the case of reading the original.

A rotary developing device 218 is comprised of a magenta developing section 219, a cyan developing section 220, a yellow developing section 221, a black developing section 222, and a clear developing section 223. The five developing sections 219 to 223 alternately come into contact with the photosensitive drum 217 to develop the electrostatic latent image formed on the same, using four color toners. A transfer drum 224 comes into contact with the photosensitive drum 217 and transfers the electrostatic latent image developed on the photosensitive drum 217 onto a sheet fed from a sheet cassette 225 or 226 and conveyed in a direction indicated by arrows in FIG. 3 to be wound around the transfer drum 224.

Thus, the five colors, i.e. the M, C, Y, K, and transparent (clear) toners are sequentially transferred onto the sheet (transfer material), whereafter the sheet is conveyed by a conveying mechanism comprising the sheet feed unit 320 to a fixing unit 227 and the image transferred on the sheet is fixed. The completely printed sheet is discharged onto a discharge tray 230.

Figure 4:
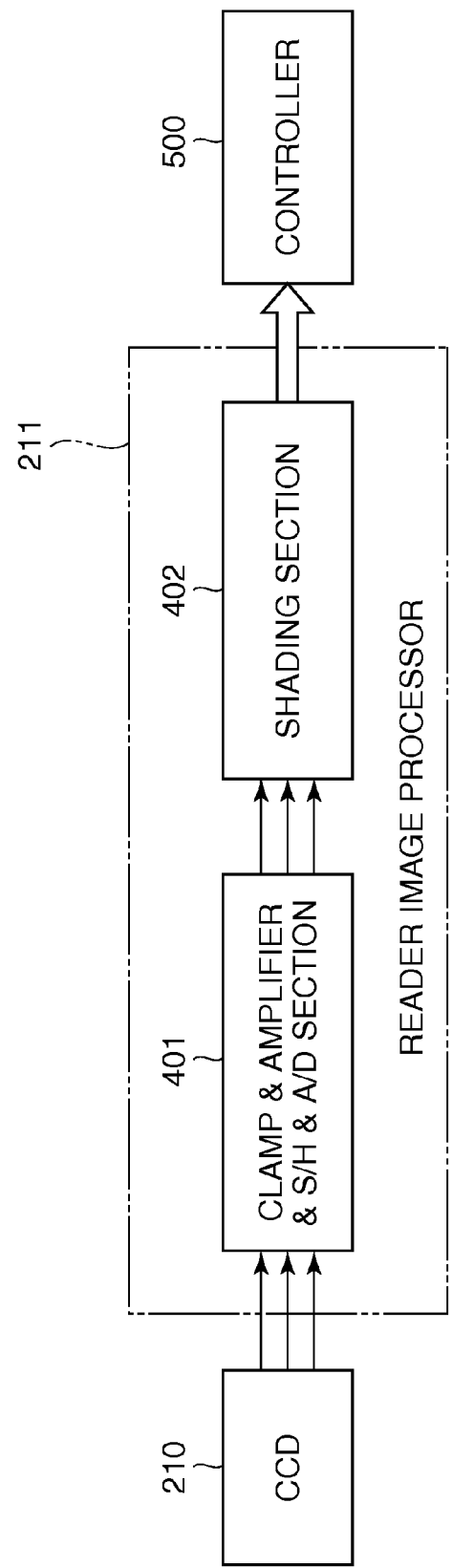
FIG. 4 is a detailed block diagram of a reader image processor of the image processing apparatus.

FIG. 4 is a detailed block diagram of the reader image processor 211 of the image processing apparatus.

As shown in FIG. 4, the reader image processor 211 is comprised of a clamp & amplifier & S/H (sample-hold) & A/D (analog-digital conversion) section 401, and a shading section 402. An original on the platen glass 203 is read by the CCD 210, and reflected light from the original is converted into an electric signal. If the CCD 210 is a color sensor, R, G, and B color filters may be mounted on one CCD line in an inline form in the order of R, G, and B, or R, G, and B filters may be respectively arranged on three CCD lines, side by side. Alternatively, on-chip filters may be used, or filters may be formed independently of the CCD.

The electric signals (analog image signals) output from the CCD 210 are input to the reader image processor 211. The clamp & amplifier & S/H & A/D section 401 of the reader image processor 211 sample-holds (S/H) the analog image signals, clamps the dark level of each of the analog image signals to a reference potential, and amplifies the analog image signals to a predetermined amount.

Further, the clamp & amplifier & S/H & A/D section 401 A/D converts the analog image signals into R, G, and B digital signals each consisting e.g. of eight bits. The processing order is not limited to that represented by the section name of the clamp & amplifier & S/H & A/D section 401. The shading section 402 performs shading correction and black correction on the 8-bit R, G, and B digital signals (RGB signals), followed by outputting these to the controller 500.

Figure 5:
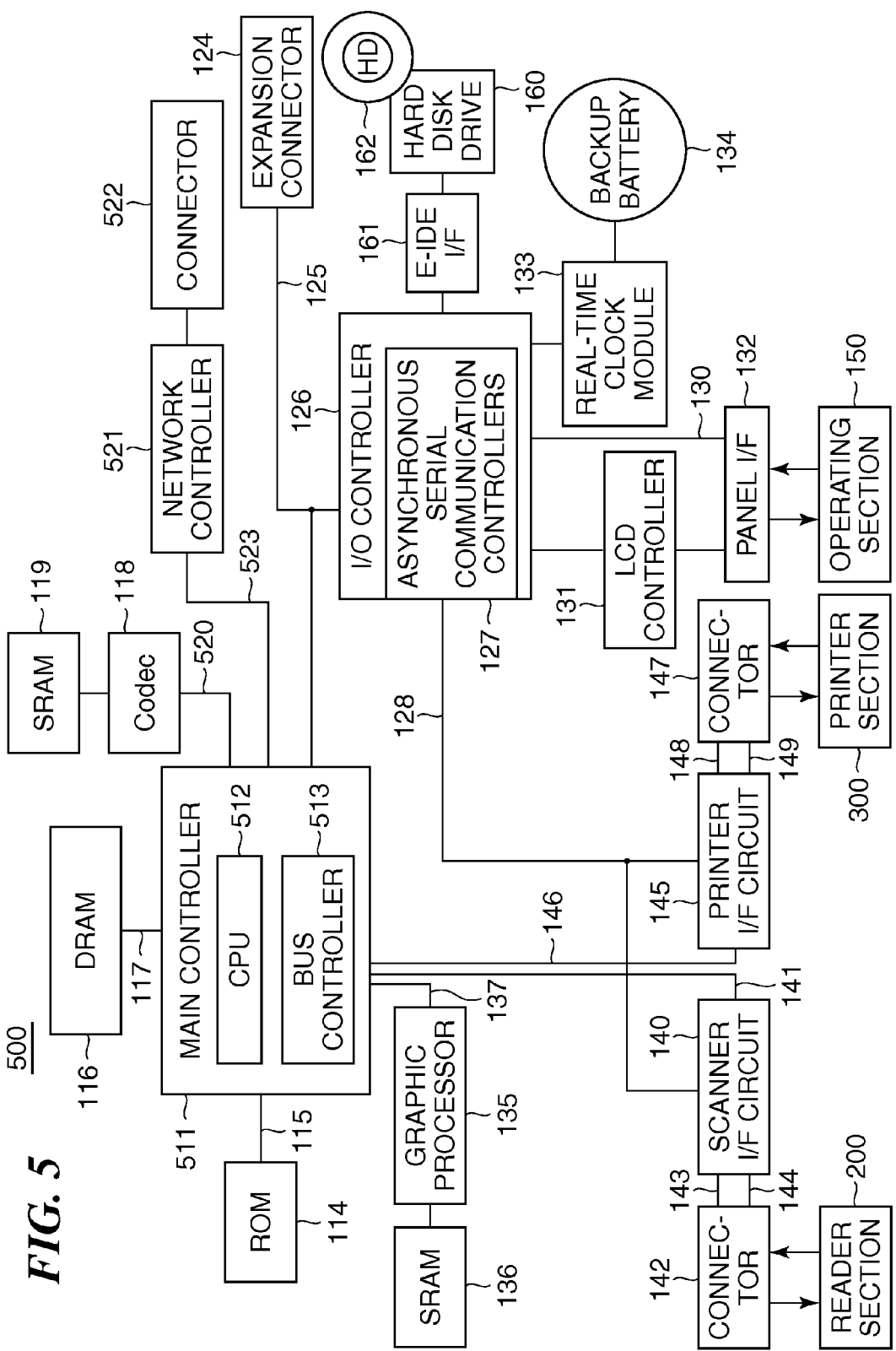
FIG. 5 is a detailed block diagram of a controller of the image processing apparatus.

FIG. 5 is a detailed block diagram of the controller 500 of the image processing apparatus.

As shown in FIG. 5, the controller 500 includes a main controller 511, a DRAM 116, a graphic processor 135, a scanner I/F circuit 140, and a printer I/F circuit 145. The controller 500 shown in FIG. 5 is an example of an arrangement for realizing a generation unit, a synthesis unit, a control unit, a first image processing unit, a second image processing unit, a third image processing unit, and a record unit, according to the present invention.

The main controller 511 is basically comprised of a CPU 512, a bus controller 513, and various kinds of I/F controller circuits (not shown). The CPU 512 and the bus controller 513 control the overall operation of the controller 500. The main controller 511 causes the CPU 512 to execute processes, described hereinafter with reference to respective flowcharts, based on a program.

The CPU 512 of the main controller 511 operates based on the program read from a ROM 114 via a ROM I/F 115. The program also describes operation of the image processing apparatus for interpreting PDL code data received from an information apparatus and converting the PDL code data into image data and attribute data. This processing operation is performed by software. The bus controller 513 is configured to control transfer of data input/output via each I/F, and performs arbitration between a plurality of devices when they desire to use the bus simultaneously and control of DMA data transfer.

The DRAM 116 is connected to the main controller 511 via a DRAM I/F 117. The DRAM 116 is used as a work area for the CPU 512 or a storage area for accumulating image data and attribute data. Further, the DRAM 116 stores clear-toner print data (see FIG. 12) described hereinafter.

A Codec (Code Decoder) 118 compresses image data and attribute data accumulated in the DRAM 116 by one of compression methods including MH, MR, MMR, JBIG, and JPEG, or expands compressed and accumulated code data into image data and attribute data. The Codec 118 is connected to the main controller 511 via an I/F 520. Data transfer between the Codec 118 and the DRAM 116 is controlled by the bus controller 513, whereby DMA transfer is enabled. A SRAM 119 is used as a temporary work area for the Codec 118.

The graphic processor 135 performs processing, such as image rotation, image magnification, color space conversion, or binarization, on image data accumulated in the DRAM 116. The graphic processor 135 is connected to the main controller 511 via an I/F 137. DMA transfer is performed by the bus controller 513 controlling data transfer between the graphic processor 135 and the DRAM 116. A SRAM 136 is used as a temporary work area for the graphic processor 135.

A network controller 521 is connected to the main controller 511 via an I/F 523. Further, the network controller 521 is connected to an external network via a connector 522. The external network is generally implemented by an Ethernet (registered trademark). A general-purpose high-speed bus 125 connects between an expansion connector 124 for connection of an expansion board and an I/O controller 126. The general-purpose high-speed bus is generally implemented by a PCI bus.

The I/O controller 126 includes two channels of asynchronous serial communication controllers 127 for transmitting and receiving control commands to and from the respective CPUs of the reader section 200 and the printer section 300. The I/O controller 126 is connected to the scanner I/F circuit 140 and the printer I/F circuit 145 by an I/O bus 128.

A panel I/F 132 is connected to an LCD controller 131. The panel I/F 132 is comprised of an interface for enabling display on a liquid crystal screen of the operating section 150 and a key input I/F 130 for enabling input via a touch panel or hard keys. The operating section 150 is comprised of a liquid crystal display, a touch panel input section affixed to the liquid crystal display, and a plurality of hard keys. A signal input via the touch panel or a hard key is transmitted to the CPU 512 of the main controller 511 via the panel I/F 132. The liquid crystal display displays image data sent via the panel I/F 132, and configuration screens for configuring settings for operations of the image processing apparatus.

A real-time clock module 133 updates and stores the date and time managed by the image processing apparatus. The real-time clock module 133 is backed up by a backup battery 134. An E-IDE interface 161 is provided for connection between the image processing apparatus and an external storage device. In the present embodiment, a hard disk drive 160 is connected to the image processing apparatus via the E-IDE I/F 161, whereby an operation for storing image data in a hard disk 162 and an operation for reading image data from the hard disk 162 are carried out. The hard disk 162 serves as a storage device for recording and accumulating all input and output image data together with detailed information on a job associated with the image data.

A connector 142 is connected to the reader section 200. The connector 142 is comprised of a synchronous serial I/F 143 and a video I/F 144. A connector 147 is connected to the printer section 300. The connector 147 is comprised of a synchronous serial I/F 148 and a video I/F 149.

The scanner I/F circuit 140 is connected to the reader section 200 via the connector 142. Further, the scanner I/F circuit 140 is connected to the main controller 511 via a scanner bus 141. The scanner I/F circuit 140 has the function of performing predetermined processing on image data received from the reader section 200 and the function of outputting to the scanner bus 141 a control signal generated based on a video control signal sent from the reader section 200. Data transfer from the scanner bus 141 to the DRAM 116 is controlled by the bus controller 513.

The printer I/F circuit 145 is connected to the printer section 300 via the connector 147. Further, the printer I/F circuit 145 is connected to the main controller 511 via a printer bus 146. The printer I/F circuit 145 has the function of performing predetermined processing on image data output from the main controller 511 and outputting the processed image data to the printer section 300, and the function of outputting to the printer bus 146 a control signal generated based on a video control signal sent from the printer section 300. Image data loaded in the DRAM 116 is DMA-transferred to the printer section 300 via the printer bus 146 and the video I/F 149 under the control of the bus controller 513.

Figure 6:
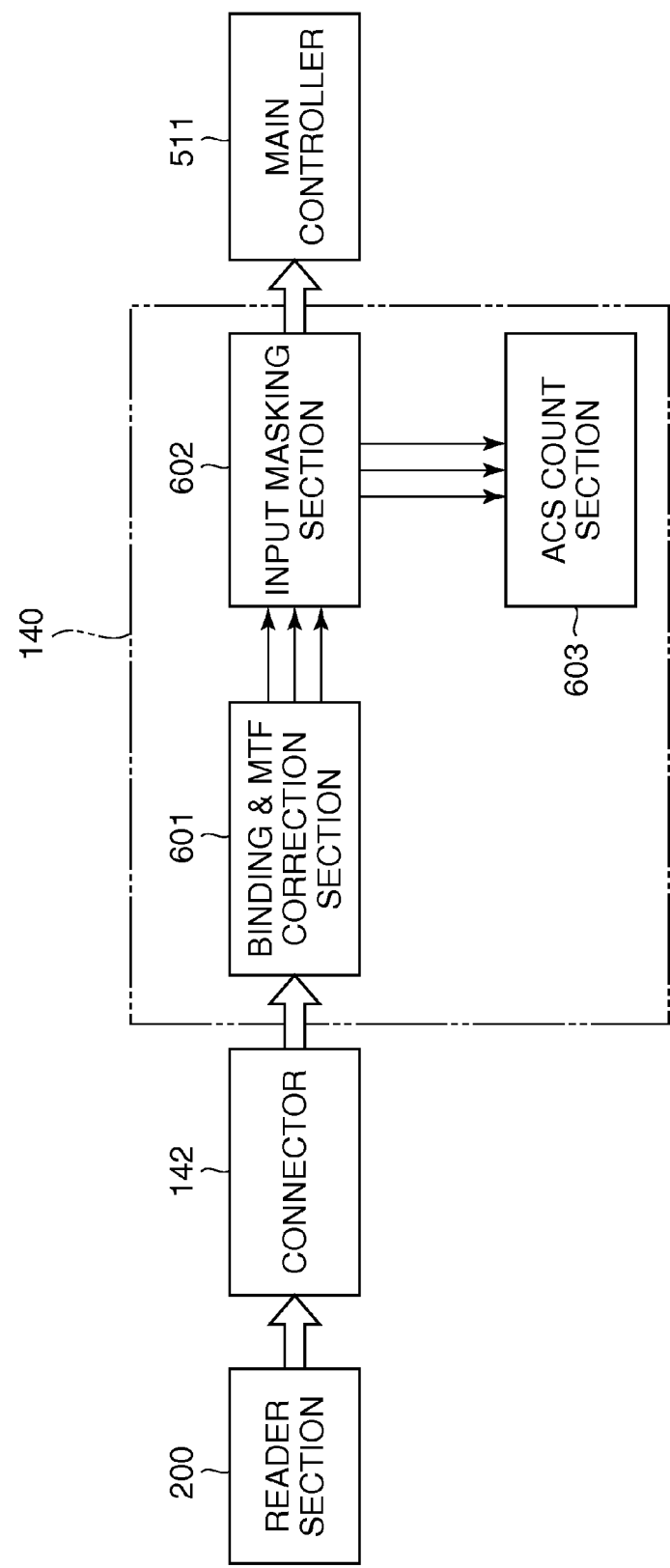
FIG. 6 is a detailed block diagram of an image processing part of a scanner interface circuit of the controller of the image processing apparatus.

FIG. 6 is a detailed block diagram of an image processing part of the scanner I/F circuit 140 of the controller 500 of the image processing apparatus.

As shown in FIG. 6, the scanner I/F circuit 140 is comprised of a binding & MTF correction section 601, an input masking section 602, and an auto color select (hereinafter acronymized as ACS) count section 603. The binding & MTF correction section 601 performs binding and MTF correction on an image signal delivered from the reader section 200 via the connector 142.

If the CCD 210 is a 3-line CCD, read positions on the respective lines differ from each other, and therefore the binding correction is performed for adjusting delay amounts of the respective lines in accordance with read speed, and correcting signal timing so as to make the read positions on the three lines coincident with each other. Further, MTF (Modulation Transfer Function) in read operation changes depending on the read speed, and therefore, MTF correction is performed to correct such a change.

Digital signals having undergone read position and timing correction by the binding & MTF correction section 601 are output to the input masking section 602. The input masking section 602 corrects the spectral characteristics of the CCD 210 and the spectral characteristics of the lamp 205 and the mirrors 206 to 208 based on the digital signals. Output signals from the input masking section 602 are sent to the ACS count section 603 and the main controller 511.

Figure 7:
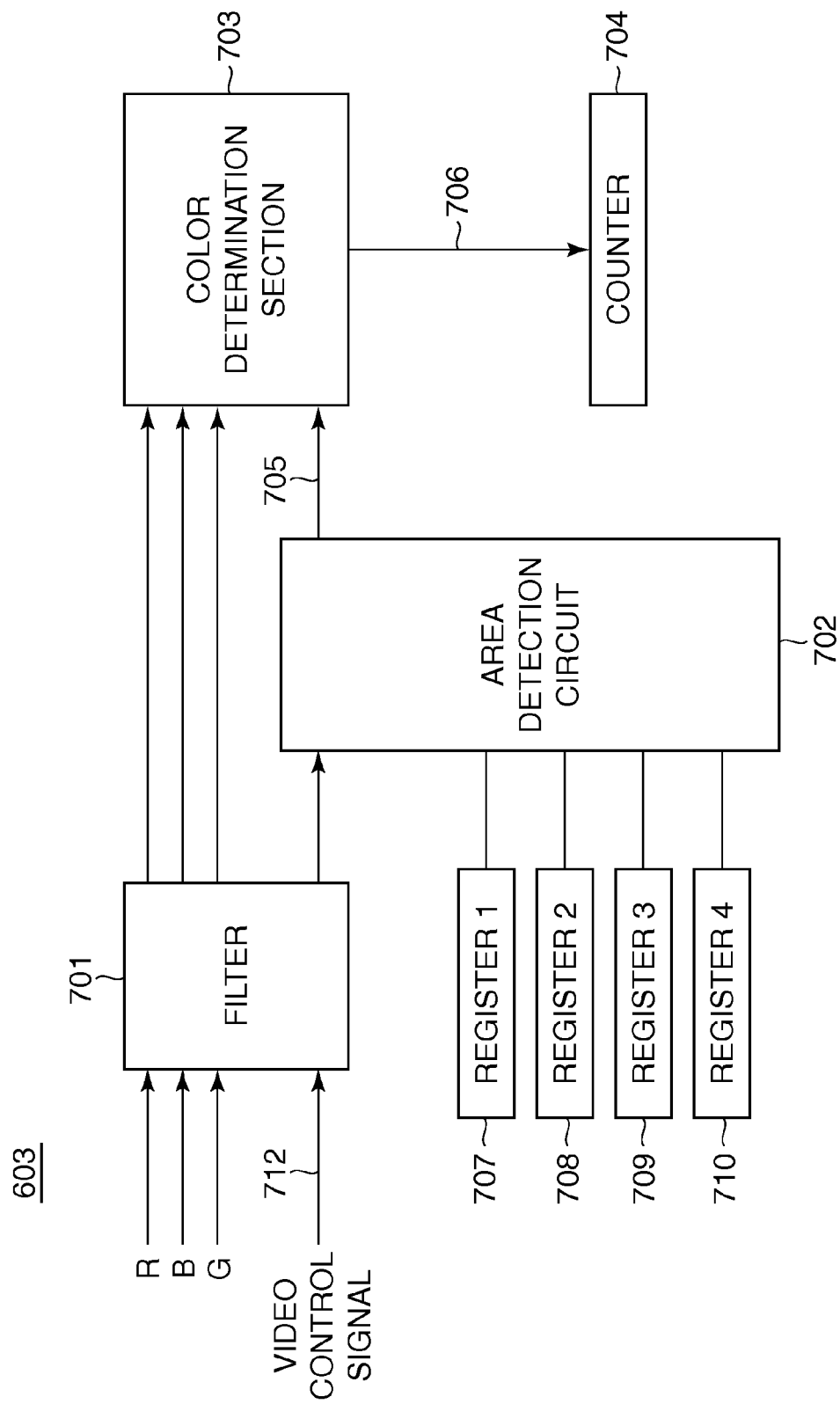
FIG. 7 is a detailed block diagram of an ACS counter of the scanner interface circuit.

FIG. 7 is a detailed block diagram of the ACS counter 603 of the scanner I/F circuit 140.

As shown in FIG. 7, the ACS counter 603 is comprised of a filter 701, an area detection circuit 702, a color determination section 703, a counter 704, a register 1 707, a register 2 708, a register 3 709, and a register 4 710.

ACS determination is performed to determine whether an original is color or monochrome. More specifically, the chroma of each of pixels constituting an original image is obtained, and color/monochrome determination is performed based on the number of pixels having chroma exceeding a predetermined threshold value. However, when viewed microscopically, even a monochrome original has numerous color pixels on or near the edge thereof due to the influence of the MTF or the like, which makes it difficult to perform ACS determination simply in units of pixels. Although various methods are provided for ACS determination, the present embodiment is not limited to a specific ACS determination method, and hence the following description will be given based on a quite general method.

When viewed microscopically, even a monochrome original image has numerous color pixels as mentioned above, and hence whether or not a pixel of the image is color is required to be determined based on information on color pixels surrounding the pixel as a target. The filter 701 of the ACS count section 603 is for use in color determination by the color determination section 703, and has a FIFO structure so as to refer to surrounding pixels in association with the target pixel.

The area detection circuit 702 generates an area signal 705 for performing ACS processing, based on values set in the respective registers 1 707 to 4 710 by the main controller 511 and a video control signal 712 sent from the reader section 200. The color determination section 703 determines whether each target pixel is color or monochrome by referring to surrounding pixels associated therewith in a memory of the filter 701, to thereby generate color determination signals 706. The counter 704 counts the number of the color determination signals 706 output from the color determination section 703.

Now, a description will be given of ACS determination. First, the main controller 511 determines an area, in which ACS processing is to be executed, of a read range of an original, and sets the aforementioned values (for setting the area) in the respective registers 1 707 to 4 710 (in the present embodiment, the range is determined independently of an original). Further, the main controller 511 compares the count of the counter 704 indicative of the number of the color determination signals 706 within the area in which ACS processing is to be executed, with a predetermined threshold value, to thereby determine whether the original is color or monochrome.

Main-scanning and sub-scanning positions in which the color determination section 703 starts the determination and ends the same are set in advance in the respective registers 1 707 to 4 710, by the aforementioned values corresponding to opposite ends of the area in the main-scanning direction and the sub-scanning direction, based on the video signal 712 sent from the reader section 200. In the present embodiment, the area is defined by determination start positions and determination end positions set such that they are approximately 10 mm smaller than the actual size of an original.

Figure 8:
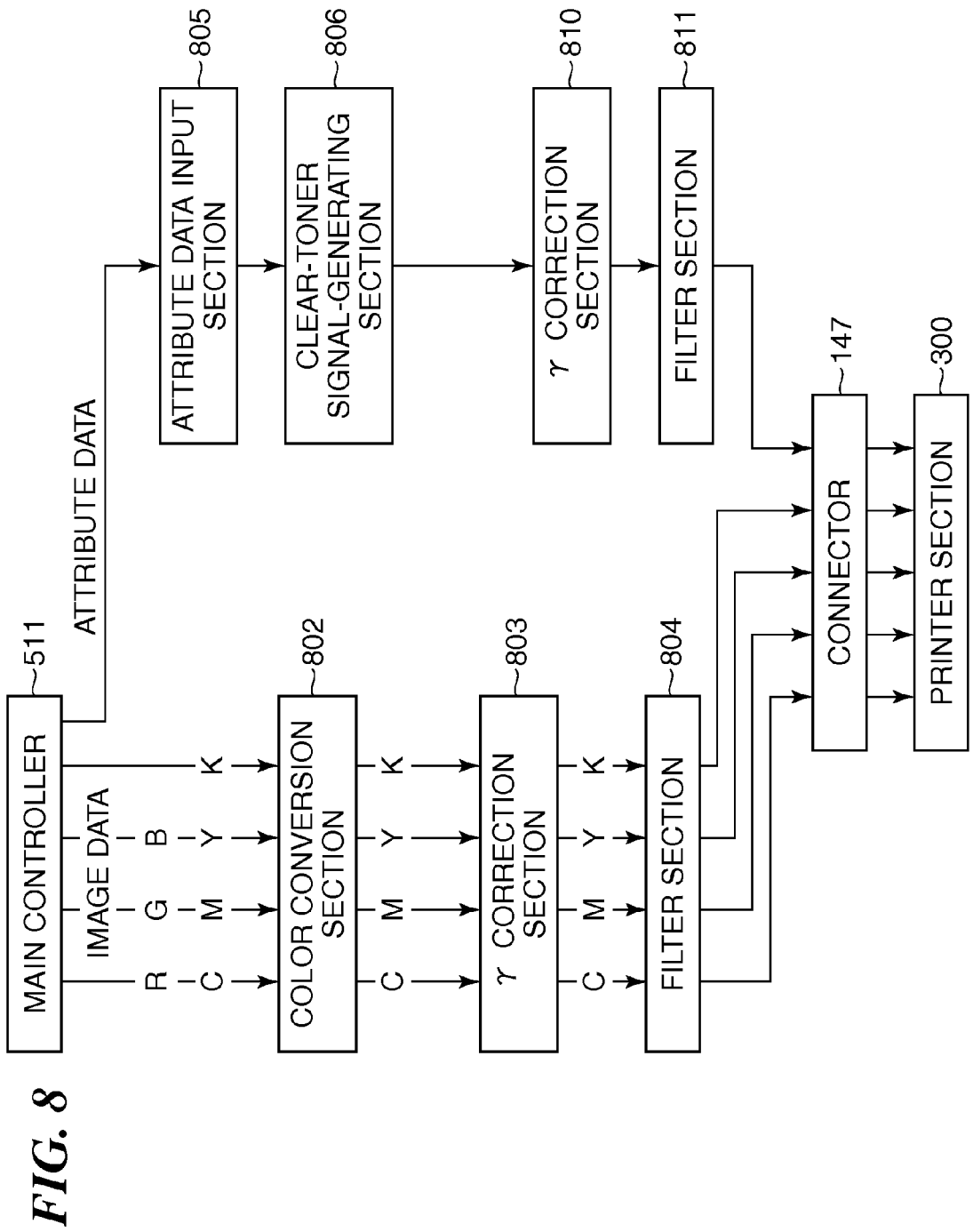
FIG. 8 is a detailed block diagram of an image processing part of a printer interface circuit of the controller of the image processing apparatus.

FIG. 8 is a detailed block diagram of an image processing part of the printer I/F circuit 145 of the controller 500 of the image processing apparatus.

As shown in FIG. 8, the printer I/F circuit 145 is comprised of a color conversion section 802, γ correction sections 803 and 810, filter sections 804 and 811, an attribute data input section 805, and a clear-toner signal-generating section 806. Image data and attribute data are delivered from the main controller 511 to the printer I/F circuit 145 via the printer bus 146 through respective different channels shown in FIG. 8.

The image data sent from the main controller 511 is input to the color conversion section 802. The color conversion section 802 converts the image data into C, M, Y, and K signals as color space signals for printout, on a pixel-by-pixel basis. In a case where image data is sent from the main controller 511 as C, M, Y, and K signals, color conversion by the color conversion section 802 is not performed. The γ correction section 803 adjusts the density of the image data. The filter section 804 carries out smoothing or edge processing on the image data subjected to density adjustment by the γ correction section 803. The image data having undergone the above-mentioned processing is delivered to the printer section 300.

On the other hand, the attribute data sent from the main controller 511 is input to the attribute data input section 805. The attribute data input section 805 analyzes where in the image to superimpose, i.e. additionally apply clear toner, based on clear toner-superimposing position information contained in the attribute data. The clear-toner signal-generating section 806 generates a clear-toner signal for a position for superimposition of the clear toner, based on the analysis by the attribute data input section 805. The γ correction section 810 performs density adjustment of the clear-toner signal. The filter section 811 carries out smoothing or edge processing on the clear-toner signal subjected to density adjustment. The clear-toner signal having undergone the above-mentioned processing is delivered to the printer section 300.

The C, M, Y, and K signals and the clear-toner signal are supplied to the printer section 300 without being synthesized into an image signal (image data). The C, M, Y, and K signals and the clear-toner signal are not synthesized into an image until the printer section 300 superimposes C, M, Y, and K toners and clear toner one upon another to thereby form a toner image.

Figure 9:
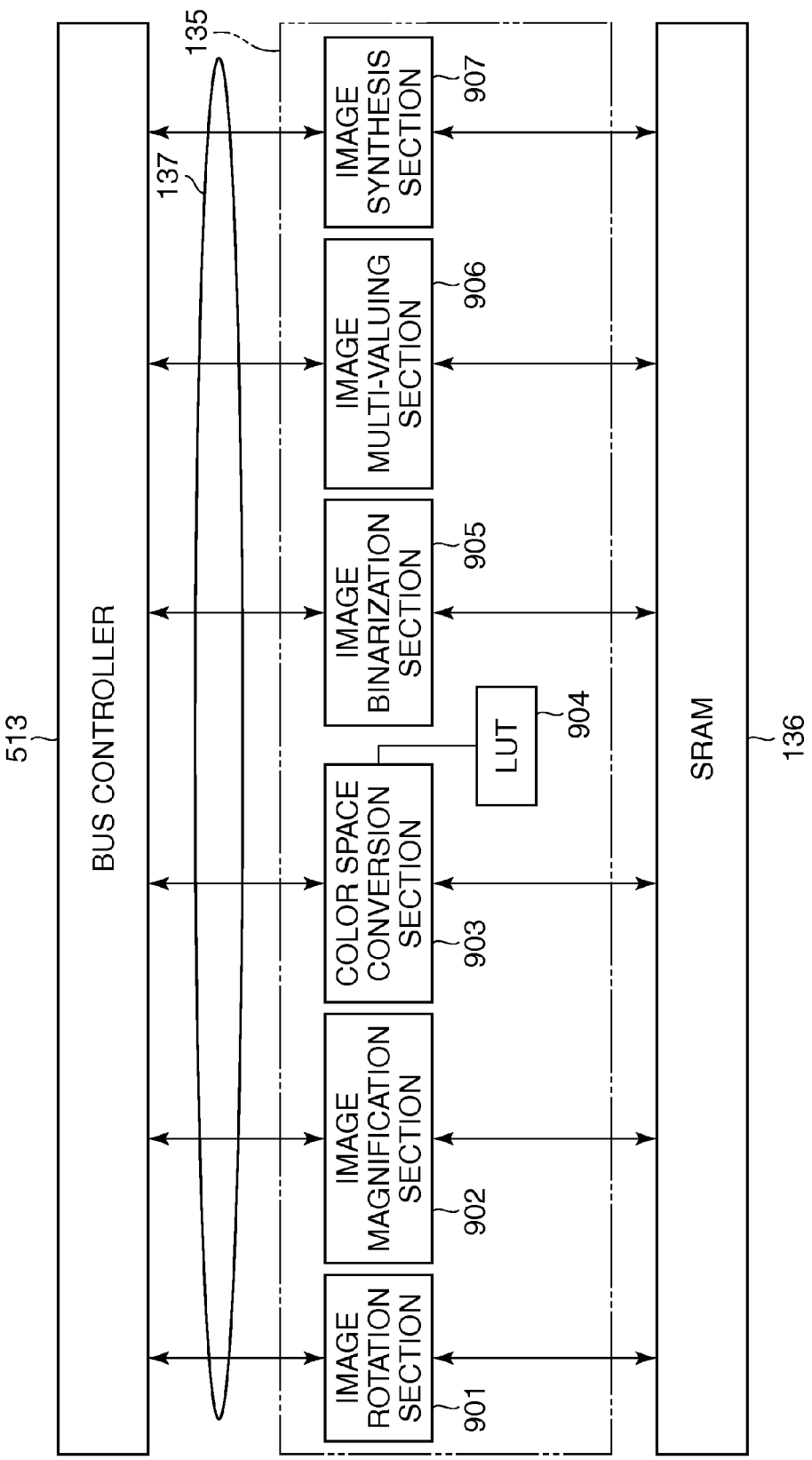
FIG. 9 is a detailed block diagram of a graphic processor of the controller of the image processing apparatus.

FIG. 9 is a detailed block diagram of the graphic processor 135 of the controller 500 of the image processing apparatus.

As shown in FIG. 9, the graphic processor 135 is comprised of an image rotation section 901, an image magnification section 902, a color space conversion section 903, an image binarization section 905, an image multi-valuing section 906, and an image synthesis section 907. Further, the color space conversion section 903 includes a LUT (Look Up Table) 904. The SRAM 136 is used as a temporary work area for each of the above-mentioned modules of the graphic processor 135. The work area is statically allocated to the modules in advance so as to prevent one work area of the SRAM 136 from being simultaneously used by a plurality of modules.

The graphic processor 135 is connected to the bus controller 513 of the main controller 511 via the I/F 137. Between the graphic processor 135 and the DRAM 116, data is DMA-transferred under the control of the bus controller 513. The bus controller 513 performs control for setting a mode and the like in each of the modules of the graphic processor 135 and timing control for transferring image data to the modules.

Figure 10:
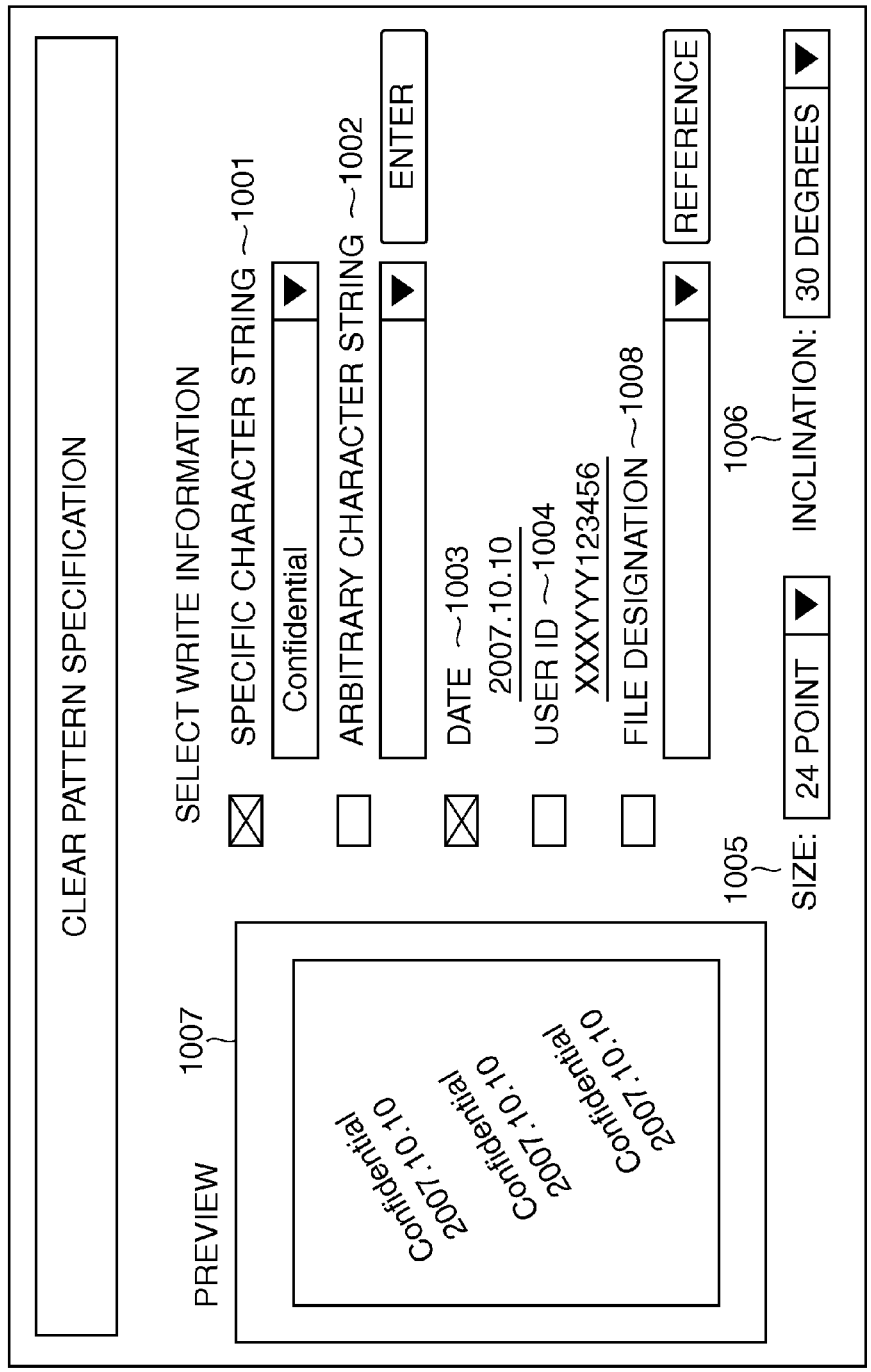
FIG. 10 is a view of an example of a configuration screen as a user interface.

FIG. 10 is a view of an example of a configuration screen as a user interface.

Referring to FIG. 10, in the present embodiment, the configuration screen as a user interface is displayed on the liquid crystal display of the operating section 150 of the image processing apparatus, or on a remote operation screen or a printer driver screen of an information apparatus connected to the image processing apparatus via the network. Items configurable on the configuration screen displayed on the operating section 150 are a specific character string 1001, an arbitrary character string 1002, a date 1003, a user ID 1004, a size 1005, an inclination 1006, and a file designation 1008.

The specific character string 1001, the arbitrary character string 1002, the date 1003, and the user ID 1004 are each configured such that whether or not to output the same can be selected using an associated checkbox. In the example shown in FIG. 10, the specific character string 1001 and the date 1003 are set to "YES". The specific character string 1001 is used to output a predetermined character string, and is configured such that one of character strings, such as "Confidential", "Top Secret", and "Copy Prohibited", can be selected from an associated pull-down menu.

The arbitrary character string 1002 is used to designate an arbitrary character string. When a right-hand input button is pressed, a soft keyboard is displayed to enable input of a desired character string. An entered character string is displayed in a textbox. The date 1003 is used to output a date on which an operation is performed, and is configured to be automatically displayed by a clock incorporated in the image processing apparatus. The user ID 1004 is used to output the user ID of a user currently using the image processing apparatus. If an associated checkbox is checked, the user's ID code is automatically displayed when the user logs in to the image processing apparatus.

The size 1005 and the inclination 1006 are used to designate a form of an image to be printed out. In the present example, it is possible to designate the size and inclination of a character string in respective associated pull-down menus. The file designation 1008 is used to designate a document file or an image file to be superimposed on the image to be printed out. When a right-hand reference button is pressed, a file tree is displayed to enable designation of a desired file. When a file is designated, it is displayed in an associated textbox. A printout to be actually obtained by carrying out printing on a sheet according to the items set as described above can be checked on a preview screen 1007 in advance.

Figure 11:
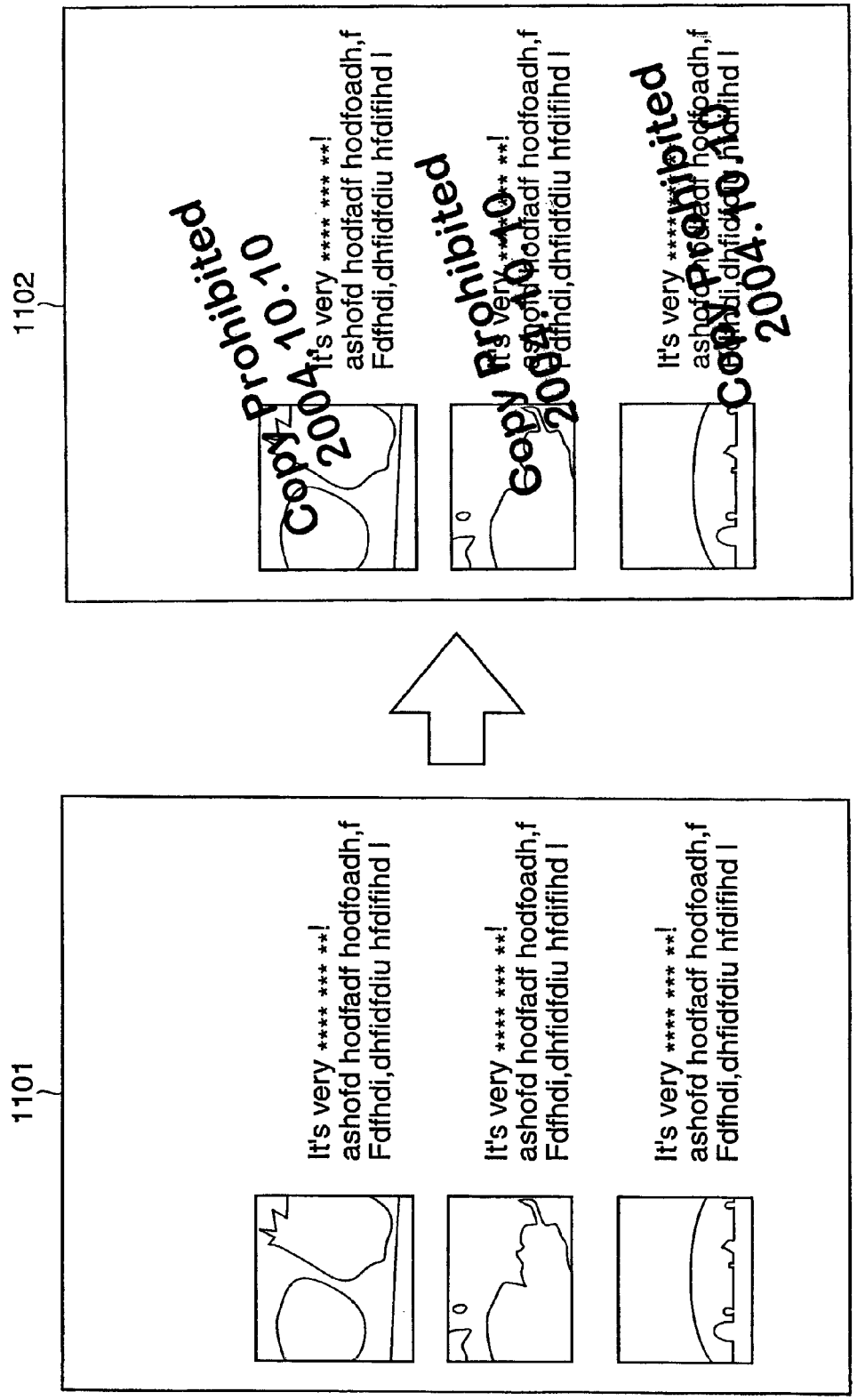
FIG. 11 is a view of a copy image obtained by superimposing a clear-toner image on an original image.

FIG. 11 is a view of a copy image formed by superimposing a clear-toner image on an original image.

Referring to FIG. 11, reference numeral 1101 denotes the original image as a base, and reference numeral 1102 the copy image. The copy image 1102 is formed by superimposing the clear-toner image on the original image 1101 read from an original by the is reader section 200 and having undergone various kinds of image processing. The clear-toner image is formed by "Copy Prohibited" and an operation date which are selected and set on the FIG. 10 configuration screen as the user interface.

The clear-toner image superimposed on the copy image 1102, i.e. the character strings ("Copy Prohibited" and "2004.10.10") designated by the user on the FIG. 10 configuration screen are formed using clear toner, and in actuality, therefore, the character strings cannot be easily perceived as an image. However, only when the copy image is obliquely observed while being exposed to lighting, the glossiness of the clear toner used to print the character strings makes it possible to perceive the character strings.

FIG. 12 is a diagram of the structure of clear-toner print data.

Referring to FIG. 12, the clear-toner print data is stored in the DRAM 116 of the controller 500 based on settings configured on the FIG. 10 configuration screen displayed on the operating section 150. Alternatively, the clear-toner print data is configured on the printer driver screen of the information apparatus 104, and the image processing apparatus receives the clear-toner print data from the information apparatus 104 via the network 107 or 108 together with print data, and stores the same in the DRAM 116.

Clear-toner image information 1201 shows the data structure of information (clear-toner print data) required for clear-toner printing in the form of a table. Reference numeral 1202 denotes information indicative of whether or not to perform clear-toner printing. If "Not Perform" is designated, detailed information (attribute information) items 1203 et seq. are not necessary.

The reference numeral 1203 denotes an attribute indicative of whether or not to perform clear-toner printing on the entire surface of a sheet. If "Perform" is designated, information items 1204 et seq. are to be excluded and hence unnecessary. The reference numeral 1204 denotes an attribute indicative of whether to partially superimpose or not superimpose clear toner on an original image. When it is determined from the attribute data and the like on the pixels of the original image to perform printing on an original image using clear toner to thereby express metal gloss, "Superimpose" is set.

Reference numeral 1205 denotes an attribute indicative of whether or not to print a character string using clear toner. If the character string is to be printed using clear toner, "Print" is set. There may be provided character string information including information items, such as character string content 1206, point 1207, font 1208, and inclination 1209. Reference numeral 1210 denotes an attribute indicative of whether or not to additionally designate a file to be printed using clear toner. If a file is to be additionally designated, "Designate" is set. Reference numeral 1211 denotes file information which is required when a file is designated, and the file information 1211 specifies a path to the file for identifying the file.

Figure 13:
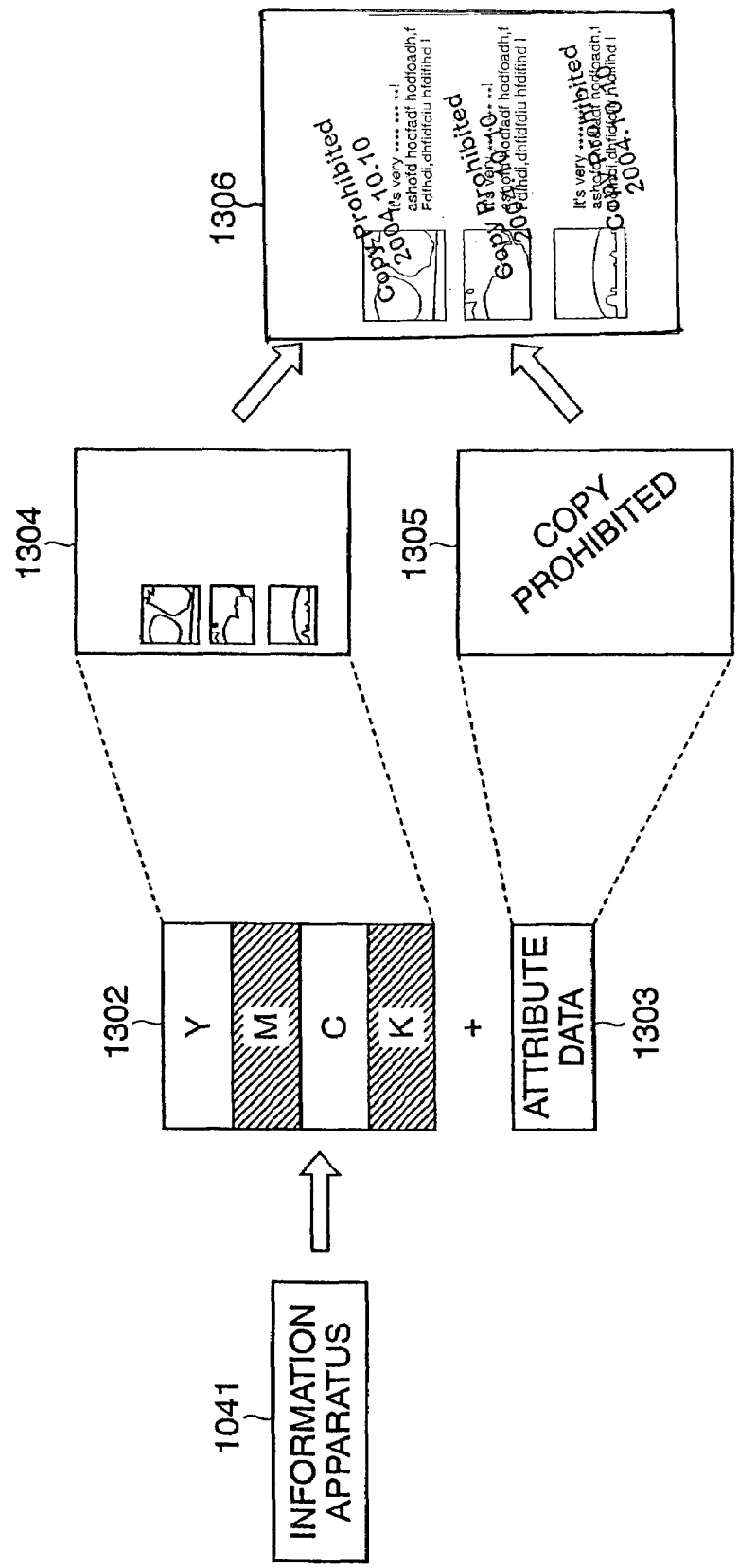
FIG. 13 is a diagram useful in explaining a method of performing clear-toner printing based on attribute data.

FIG. 13 is a diagram useful in explaining a method of performing clear-toner printing based on attribute data.

In FIG. 13, there is shown a case where PDL data comprised of image data 1302 and attribute data 1303 is input to the image processing apparatus from the information apparatus 104. More specifically, data which the image processing apparatus has received from the information apparatus 104 is converted into PDL data comprised of the image data 1302 having four Y, M, C, and K planes and the attribute data 1303. In this case, when information for superimposing a clear-toner image on the image to be printed is registered via the FIG. 10 configuration screen as a user interface, attribute data required for superimposition of the clear-toner image is generated.

The attribute data 1303 includes clear-toner attribute data (i.e. the clear-toner print data shown in FIG. 12) and other attribute data. The other attribute data is information indicative of which of a character string, an image, and graphics is formed by pixels constituting the image data 1302, i.e. information for specifying an image area.

Reference numeral 1304 denotes image data information included in the image data 1302 comprised of the YMCK planes. Reference numeral 1305 denotes clear-toner signal information included in the attribute data 1303. The image processing apparatus superimposingly prints a clear-toner image on a sheet 1306 based on the information 1304 and 1305.

Figure 14:
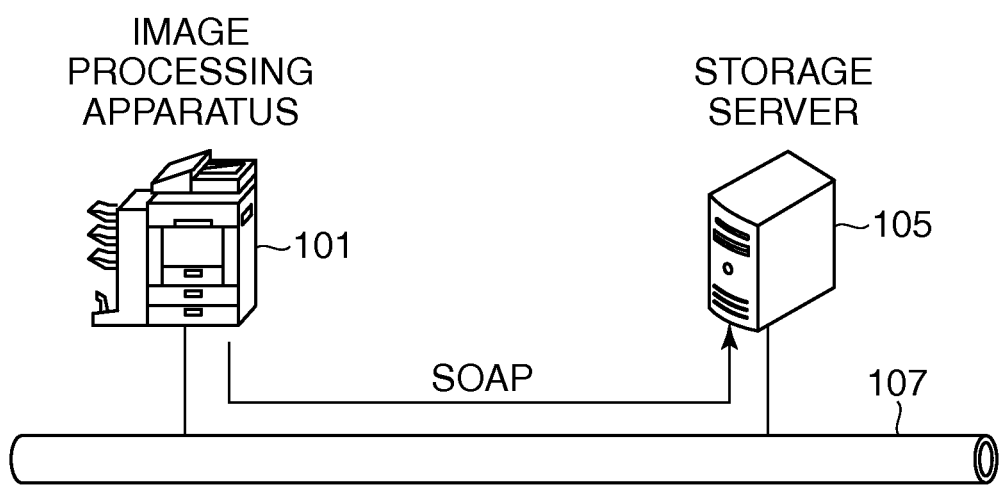
FIG. 14 is a schematic diagram of a system in which the image processing apparatus writes image data and detailed job information into a storage server.

FIG. 14 is a schematic diagram of a system in which the image processing apparatus 101 writes image data and detailed job information into a storage server 105.

FIG. 14 illustrates an example of how the image processing apparatus 101 writes image data and detailed information (history record: job history event) on a job processed by the image processing apparatus 101 into the storage server 105 (external record unit). In the present embodiment, the network is implemented by the Ethernet (registered trademark) 107.

Further, the image processing apparatus 101 stores image data and detailed job information in the storage server 105 using SOAP (Simple Object Access Protocol). However, this is not limitative, but any other protocol may be used insofar as the protocol enables transfer of existing data. Further, encryption may be executed using e.g. SSL (Secure Sockets Layer), as required.

Data in the storage server 105 may be encrypted and stored. Further, although in the present embodiment, the image processing apparatus 101 and the storage server 105 are provided separately, the image processing apparatus 101 may incorporate the function of the storage server 105. In the present embodiment, configuration information required for access to the storage server 105 is protected such that only the system administrator of the image processing apparatus 101 is authorized to configure the information.

FIG. 15 is a diagram of an example of a history record stored in the storage server 105.

Referring to FIG. 15, rows denoted by reference numerals 1501 to 1510 correspond to respective items of the history record. In an "item" column, there are shown items (job kind to copy count). Boxes of a "tag name" column each store an item-specific tag name for identifying associated data. The column of Example 1 shows examples of record information. The item 1501 stores a job kind which shows a kind of job, such as COPY, FAX, or PDL. A tag name associated therewith is [JobKind]. The item 1502 stores a job name which shows a name of an executed job. A tag name associated therewith is [JobName]. The item 1503 stores a job client which shows a user name associated with the executed job. A tag name associated therewith is [ClientName].

The item 1504 stores character code Information which shows a character code used in the present record. A tag name associated therewith is [CharacterCode]. The item 1505 stores a section code which shows the section number of a section to which the user belongs. A tag name associated therewith is [SectionNo]. The item 1506 stores a job start time (communication start time) which shows the start time of the job. A tag name associated therewith is [StartTime]. The item 1507 stores a job end time (Communication End Time) which shows the end time of the job. A tag name associated therewith is [EndTime].

The item 1508 stores a job end result which shows a final result of the job, such as "OK" or "Canceled". A tag name associated therewith is [Result]. The item 1509 stores a sheet count per copy which shows how many pages are to be printed in the job. A tag name associated therewith is [ResourceCount]. The item 1510 stores a copy count which shows how many copies are to be output. A tag name associated therewith is [Copies]. These items 1501 to 1510 are not always all used. When an item is not used, the item is recorded as one with no content.

Figure 16:
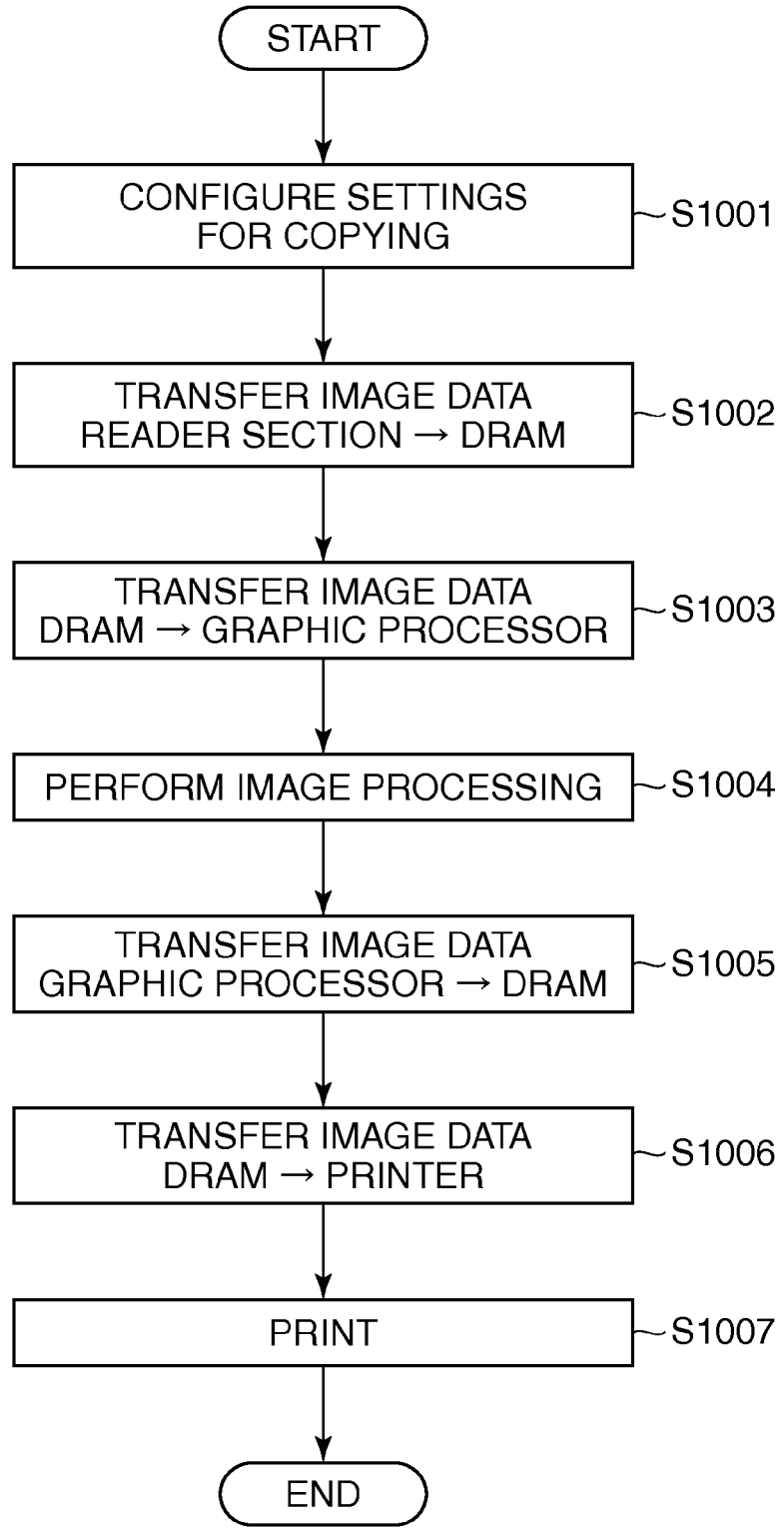
FIG. 16 is a flowchart of a copy output job process executed by the image processing apparatus.

FIG. 16 is a flowchart of a copy output job process executed by the image processing apparatus.

The copy output job process in which the image processing apparatus reads an image from an original and prints the image on a sheet will be described with reference to FIG. 16. In a step S1001, when settings configured for a copy output job by a user via the operating section 150 are received, the main controller 511 of the controller 500 detects that copy settings have been configured. The copy settings include a copy count, a sheet size, single-sided copying/bookbinding as to whether to perform copying on only one side of each sheet and whether to bind copied sheets, an enlargement or reduction ratio set for copying, a setting as to whether or not to perform sort output of copied sheets, and a setting as to whether or not to perform stapling. It should be noted that in the step S1001, settings as to an image to be superimposed using clear toner may be configured using the FIG. 10 configuration screen. In this case, the attribute data including clear-toner attribute data is generated by the CPU 512.

Then, in a step S1002, the main controller 511 accepts a copy start instruction issued by the user via the operating section 150, and causes the CPU 512 to control the reader section 200 via the scanner I/F 140 and the connector 142 to read an image from an original. The image data read from the original by the reader section 200 is stored in the DRAM 116.

In a conventional image processing apparatus (copying machine), magnification processing in the sub scanning direction is achieved by changing the moving speed of an optical unit according to an enlargement or reduction ratio (i.e. a magnification in the sub scanning direction) set for copying. On the other hand, in the image processing apparatus according to the present embodiment, an original image is read at 100% magnification irrespective of an enlargement or reduction ratio set for copying, and magnification processing in both the main scanning direction and the sub scanning direction is executed by the graphic processor 135.

Next, in a step S1003, the main controller 511 transfers the image data read from the original by the reader section 200 and stored in the DRAM 116 to the graphic processor 135. In a step S1004, the main controller 511 causes the graphic processor 135 to perform image processing on the image data based on the parameters set for copying. For example, when the enlargement ratio is set to 400% for copying, magnification processing in both the main scanning direction and the sub scanning direction is carried out using an image magnification section as a module in the graphic processor 135.

Then, in a step S1005, the main controller 511 receives the image data having undergone the image processing and attribute data from the graphic processor 135, and stores the received image data and attribute data in the DRAM 116.

Next, in a step S1006, the main controller 511 transfers the image data stored in the DRAM 116 to the printer section 300 in appropriate timing while controlling the printer section 300 via the printer I/F circuit 145 and the connector 147.

Then, in a step S1007, the main controller 511 controls the printer section 300 to execute print output for forming an image corresponding to the image data on a sheet. When transfer of the image data is completed, i.e. when the copy output job is completed, the present process is terminated. In a case where settings have been configured for an image to be superimposed using clear toner, a clear-toner image signal is generated based on clear-toner attribute data, and a clear-toner image formed based on the generated signal is superimposed on a full-color toner image formed by C, M, Y, and K toner images to thereby form an image on a sheet.

Figure 17:
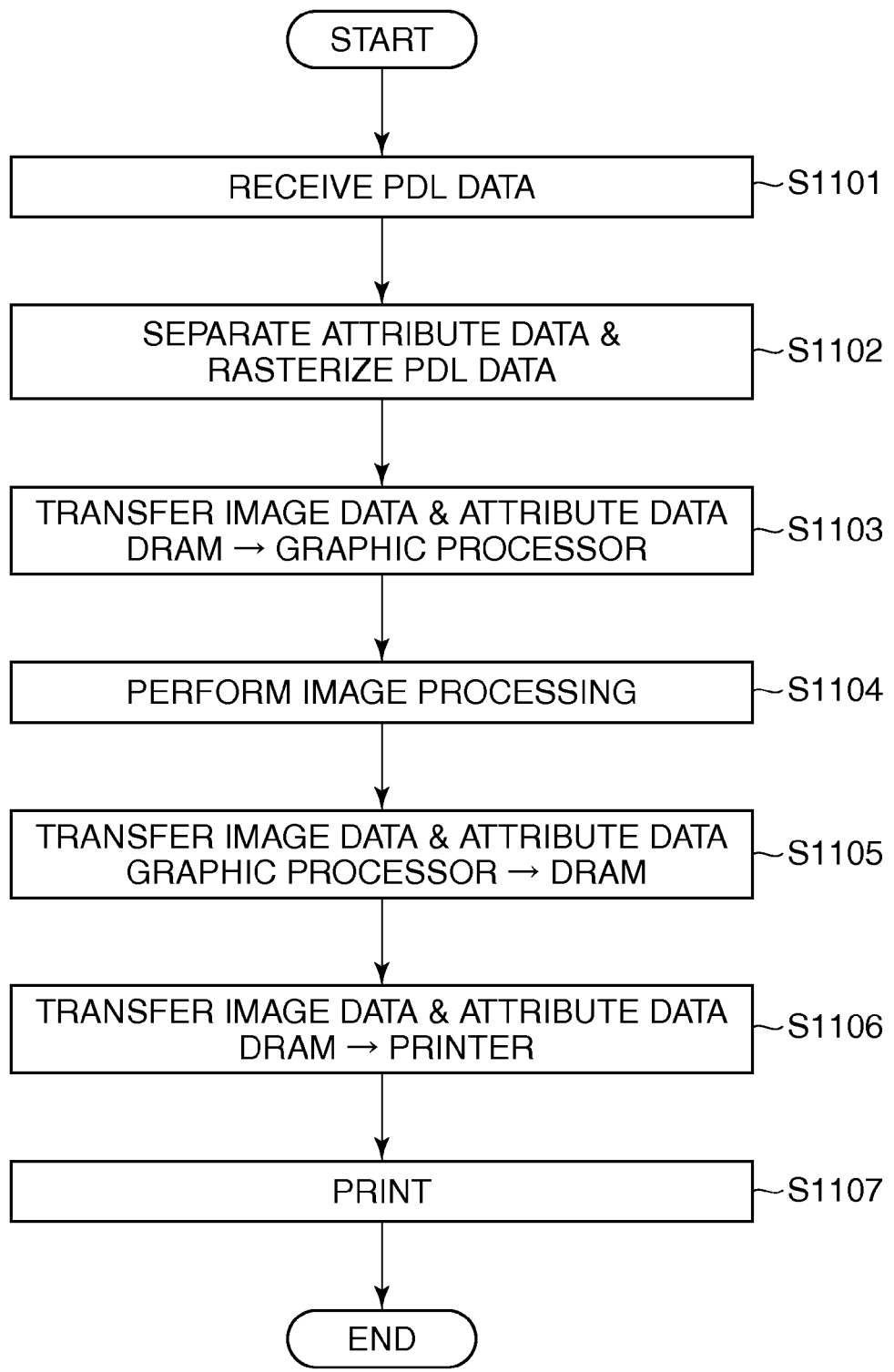
FIG. 17 is a flowchart of a PDL print output job process executed by the image processing apparatus.

FIG. 17 is a flowchart of a PDL print output job process executed by the image processing apparatus.

The PDL print output job process in which the image processing apparatus receives PDL data from the information apparatus 104 and performs printing on a sheet will be described with reference to FIG. 17. In a step S1101, the main controller 511 receives PDL data generated by driver software installed in the information apparatus 104, from the information apparatus 104 via the network. In the step S1101, settings as to an image to be superimposed using clear toner may be configured using the FIG. 10 configuration screen displayed on the printer driver screen of the information apparatus 104.

Next, in a step S1102, the main controller 511 separates the attribute data 1303 from the PDL data received from the information apparatus 104 and transferred via the connector 522 and the network controller 521. Further, the main controller 511 rasterizes the portion separated from the attribute data 1303 into the image data 1302. In a step S1103, the main controller 511 transfers the image data 1302 and the attribute data 1303 loaded in the DRAM 116 to the graphic processor 135.

Then, in a step S1104, the main controller 511 causes the graphic processor 135 to carry out image processing on the image data. For example, when the sheet feed unit 320 of the printer section 300 contains only A4R sheets though A4 sheet size is designated by the user, the main controller 511 causes the graphic processor 135 to rotate the image through 90 degrees. This makes it possible to perform image output according to a feedable sheet.

Then, in a step S1105, the main controller 511 receives the image data having undergone the image processing and attribute data from the graphic processor 135, and stores the received image data and attribute data in the DRAM 116.

Next, in a step S1106, the main controller 511 transfers the image data and the attribute data stored in the DRAM 116 to the printer section 300 in appropriate timing while controlling the printer section 300 via the printer I/F circuit 145 and the connector 147. In this case, the main controller 511 causes the printer I/F circuit 145 to carry out image processing on the image data and analyze the attribute data to generate the clear-toner signal 1305. Thereafter, the main controller 511 performs control such that a clear-toner image generated based on the clear-toner signal 1305 is superimposed on a predetermined portion of an image to be printed out.

Then, in a step S1107, the main controller 511 controls the printer section 300 to execute print output for forming an image corresponding to the image data on a sheet. When transfer of the image data is completed, i.e. when the PDL print output job is completed, the present process is terminated.

According to the prior art, in a process corresponding to the FIG. 16 flowchart, the C, M, Y, and K image data obtained by reading an original are sent to a security unit (the storage server within the image processing apparatus or the external storage server 105). However, a clear-toner signal, which is not image data obtained by reading the original, is not sent to the security unit.

Further, as shown in the FIG. 17 flowchart, when the PDL data which the image processing apparatus has received from the information apparatus 104 contains clear-toner attribute data, the main controller 511 separates the clear-toner attribute data from the PDL data in the step S1103. More specifically, the clear-toner attribute data is separated as the attribute data 1303 appearing in FIG. 13. In this case, according to the prior art, C, M, Y, and K image data are sent to the security unit, whereas the clear-toner signal generated based on the attribute data 1303, which is not the C, M, Y, and K image data, is not.

Figure 18:
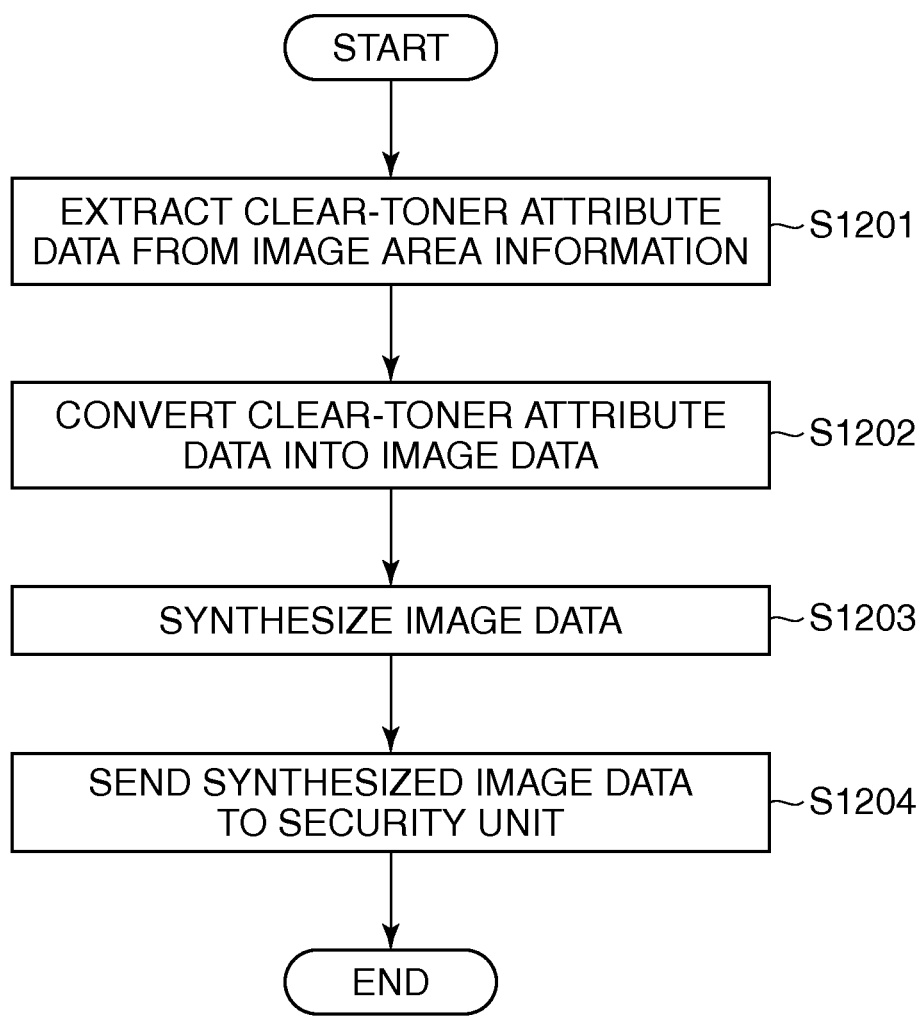
FIG. 18 is a flowchart of an attribute data transmission process for transmitting clear-toner attribute data from the image processing apparatus to a security unit.

To solve this problem, as shown in FIG. 18, the clear-toner attribute data included in the attribute data is converted into image data, and then the image data obtained by the conversion from the attribute data is synthesized with the original image data. Thereafter, not only the image data but also the attribute data are sent to the security unit via the network.

FIG. 18 is a flowchart of an attribute data transmission process for transmitting clear-toner attribute data from the image processing apparatus to the security unit. The FIG. 18 attribute data transmission process is executed as part of the step S1006 in FIG. 16 or part of the step S1106 in FIG. 17.

Referring to FIG. 18, in a step S1201, the main controller 511 extracts the clear-toner attribute data from the attribute data. In a step S1202, the main controller 511 converts the extracted clear-toner attribute data into image data.

Next, in a step S1203, the main controller 511 synthesizes rasterized image data (first image data) and image data (second image data) generated based on the clear-toner attribute data to generate image data for recording in the DRAM 116. In a step S1204, the main controller 511 sends the recording image data stored in the DRAM 116 to the security unit, followed by terminating the present process.

Image data to be sent from the image processing apparatus to the security unit may be provided by causing the graphic processor 135 to carry out image processing (e.g. resolution change or color space change) on image data input to the image processing apparatus.

More specifically, image data which is obtained by causing the graphic processor 135 to synthesize third image data obtained by carrying out image processing on the first image data, and fourth image data obtained by carrying out image processing on the second image data may be sent to the security unit to be recorded therein. In this case, it is possible to select one of a mode for synthesizing the third image data and the fourth image data and recording the synthesized image data and a mode for recording the third image data and the fourth image data separately, as described hereinafter with reference to FIG. 19.

Alternatively, image data obtained by carrying out image processing on the image data obtained by synthesizing the first image data and the second image data may be sent to the security unit for recording therein. In this case, it is possible to select one of a mode for synthesizing the first image data and the second image data and recording the synthesized image data and a mode for recording the first image data and the second image data separately, as described hereinafter with reference to FIG. 19.

As described above, according to the present embodiment, it is possible to record not only image data, but also clear-toner attribute data, as job history information in the security unit. This makes it possible to prevent a malicious third party from sending secret information as clear-toner attribute data to the image processing apparatus and printing out the secret information without leaving any evidence.

A second embodiment of the present invention is distinguished from the above-described first embodiment by a point described below. The other elements in the present embodiment are identical to the corresponding ones in the first embodiment (FIGS. 2, 3, 5, and so forth), and therefore description thereof is omitted.

In the first embodiment, rasterized image data and image data generated based on clear-toner attribute data are synthesized, and the synthesized image data is sent as recording image data to the security unit.

In contrast, in the present embodiment, rasterized image data and image data generated based on clear-toner attribute data can be separately sent as recording image data to the security unit.

FIG. 19 is a view of a configuration screen as a user interface for specifying whether or not to perform synthesis of recording image data in the second embodiment.

Referring to FIG. 19, in the present embodiment, the configuration screen as a user interface is displayed on the liquid crystal display of the operating section 150 of an image processing apparatus or on the remote operation screen or the printer driver screen of an information apparatus connected to the image processing apparatus via the network. On the configuration screen displayed on the operating section 150 (selecting unit), it is possible to select a desired one of two recording modes "record synthesized image" 1901 and "record separate images" 1902.

When the mode "record synthesized image" 1901 is selected as a recording mode, rasterized image data and image data generated based on clear-toner attribute data are synthesized, and the synthesized image data is sent to the security unit for recording therein. On the other hand, when the mode "record separate images" 1902 is selected as a recording mode, the two image data items are separately sent to the security unit to be recorded therein.

Figure 20:
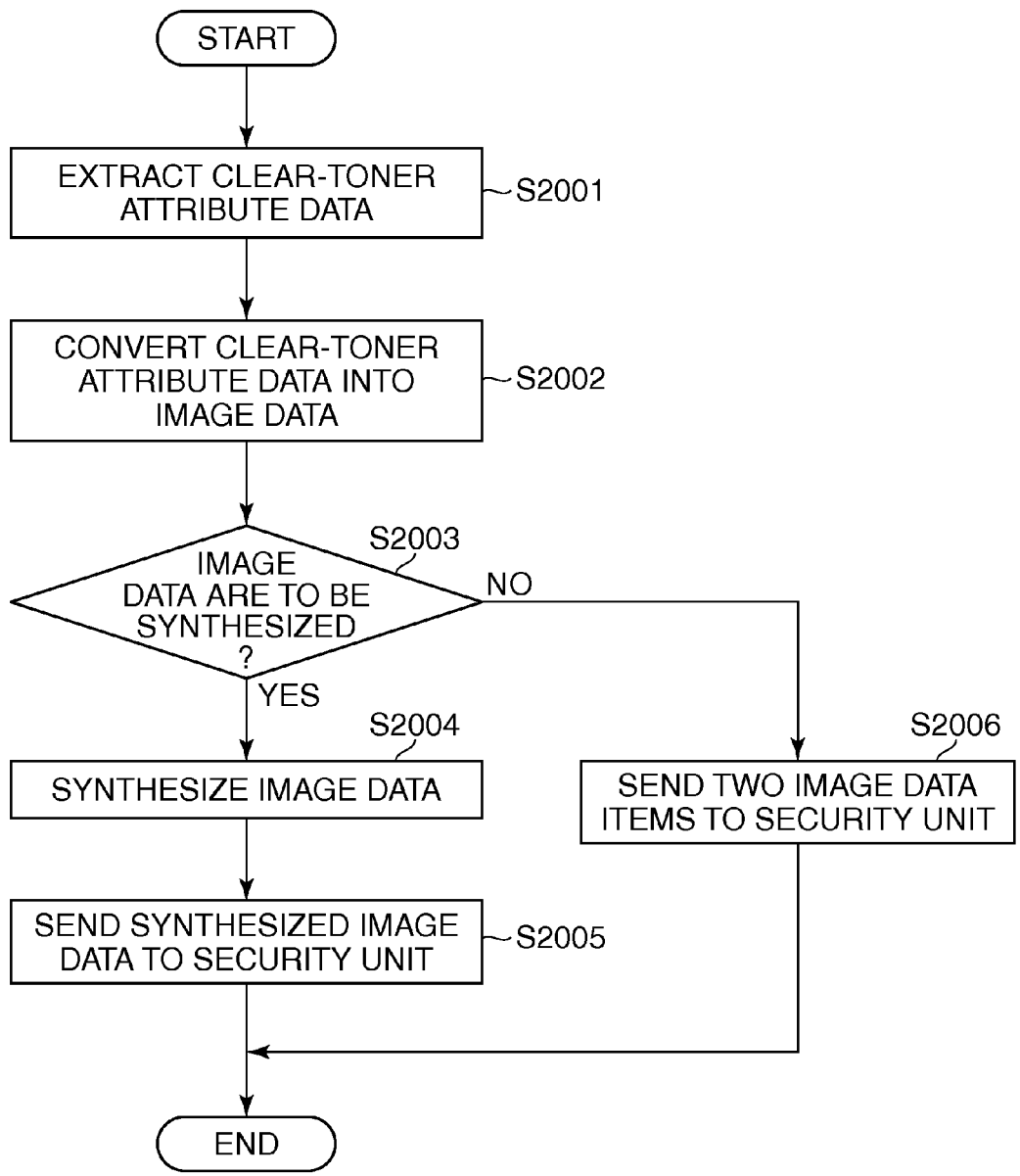
FIG. 20 is a flowchart of a recording image data transmission process for transmitting image data for recording from the image processing apparatus to the security unit.

FIG. 20 is a flowchart of a recording image data transmission process for transmitting image data for recording from the image processing apparatus to the security unit. In the present embodiment, the recording image data transmission process shown in FIG. 20 is executed in place of the attribute data transmission process in FIG. 18 in the first embodiment.

Referring to FIG. 20, in a step S2001, the main controller 511 of the controller 500 extracts the clear-toner attribute data from the attribute data loaded in the DRAM 116 together with the rasterized image data in the step S1103 in FIG. 17. In a step S2002, the main controller 511 converts the extracted clear-toner attribute data into image data. Then, in a step S2003, the main controller 511 determines whether or not the user has selected the mode "record synthesized image" 1901 on the FIG. 19 configuration screen.

If the user has selected the mode "record synthesized image" 1901, the process proceeds to a step S2004, wherein the main controller 511 synthesizes the rasterized image data and the image data generated based on the clear-toner attribute data, to thereby generate image data for recording in the DRAM 116. In a step S2005, the main controller 511 sends the recording image data in the DRAM 116 to the security unit via the network, followed by terminating the present process.

On the other hand, if the user has selected the mode "record separate images" 1902, the process proceeds to a step S2006. In the step S2006, the main controller 511 separately sends the rasterized image data from the DRAM 116 and the image data generated based on the clear-toner attribute data from the DRAM 116 to the security unit, as respective recording image data items, via the network, and then terminates the present process. It should be noted that when the rasterized image data and the image data generated based on the clear-toner attribute data are separately sent to the security unit, the security unit stores these two image data items and manages them in association with each other.

As described above, according to the present embodiment, it is possible to select the mode for separately sending the rasterized image data and the image data generated based on the clear-toner attribute data to the security unit. More specifically, it is possible to select the mode enabling only a portion of the image having the clear-toner image superimposed thereon to be checked, so that a problem that the portion having the clear-toner image superimposed thereon is hidden behind the image formed based on the rasterized image data can be solved. This makes it possible to enhance secret security.

Further, it is to be understood that the present invention may also be accomplished by supplying a system or an apparatus with a storage medium in which a program code of software, which realizes the functions of either of the above described embodiments, is stored, and causing a computer (or CPU or MPU) of the system or apparatus to read out and execute the program code stored in the storage medium.

In this case, the program code itself read from the storage medium realizes the functions of either of the above described embodiments, and therefore the program code and the storage medium in which the program code is stored constitute the present invention.

Examples of the storage medium for supplying the program code include a floppy (registered trademark) disk, a hard disk, a magnetic-optical disk, an optical disk, such as a CD-ROM, a CD-R, a CD-RW, a DVD-ROM, a DVD-RAM, a DVD-RW, or a DVD+RW, a magnetic tape, a nonvolatile memory card, and a ROM. Alternatively, the program may be downloaded via a network.

Further, it is to be understood that the functions of either of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of either of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2008-159158 filed Jun. 18, 2008, which is hereby incorporated by reference herein in its entirety.

What is claimed is:

1. An image processing apparatus comprising:
an image forming unit adapted to be capable of receiving first image data and attribute data, forming an image corresponding to the first image data on a transfer material using at least one of color-toner and monochrome-toner, and forming an image of information indicated by the attribute data on the transfer material in a manner superimposed on the image using clear-toner;
a generation unit adapted to generate second image data from the attribute data;
a control unit adapted to perform control such that the first image data and the second image data are recorded as history information on a job processed by the image processing apparatus;
a synthesizing unit adapted to synthesize the first image data and the second image data; and
a selecting unit adapted to select one of:
a mode for synthesizing, by the synthesizing unit, the first image data and the second image data and recording the synthesized image data and
a mode for separately recording the first image data and the second image data without synthesizing the first image data and the second image data.

2. The image processing apparatus according to claim 1, wherein the attribute data includes clear-toner attribute data to be formed on the transfer material and an attribute indicative of which of at least two of a character string, an image, and a graphic, is formed by pixels constituting the image.

3. The image processing apparatus according to claim 1, further comprising:
a first image processing unit adapted to perform image processing on the first image data to thereby generate third image data; and
a second image processing unit adapted to perform image processing on the second image data to thereby generate fourth image data, and
wherein said control unit performs control such that the third image data and the fourth image data are recorded as the history information on the job processed by the image processing apparatus.

4. The image processing apparatus according to claim 1, wherein the synthesis unit is further adapted to synthesize the third image data and the fourth image data, and
wherein said control unit performs control such that image data synthesized by said synthesis unit is recorded as the history information on the job processed by the image processing apparatus.

5. The image processing apparatus according to claim 4, wherein the selecting unit is further adapted to select one of a mode for synthesizing the third image data and the fourth image data and recording the synthesized image data and a mode for recording the third image data and the fourth image data without synthesizing the third image data and the fourth image data.

6. The image processing apparatus according to claim 1, wherein said control unit performs control such that history information on a job in which image data has been processed by the image processing apparatus is recorded in an external apparatus.

7. The image processing apparatus according to claim 1, further comprising a record unit adapted to record image data as the history information on the job processed by the image processing apparatus.

8. A method of controlling an image processing apparatus, comprising:
receiving at the image processing apparatus first image data and attribute data;
forming second image data from the attribute data;
forming an image corresponding to the first image data on a transfer material using at least one of color-toner and monochrome-toner and forming an image of information indicated by the attribute data on the transfer material in a manner superimposed on the image using clear-toner;
performing control such that the first image data and the second image data are recorded as history information on a job processed by the image processing apparatus; and
selecting one of:
a mode for synthesizing the first image data and the second image data and recording the synthesized image data, and
a mode for separately recording the first image data and the second image data without synthesizing the first image data and the second image data.

9. A non-transitory computer-readable storage medium storing a program for causing a computer to execute a method of controlling an image processing apparatus,
wherein the method comprises:
receiving at the image processing apparatus first image data and attribute data;
forming second image data from the attribute data;
forming an image corresponding to the first image data on a transfer material using at least one of color-toner and monochrome-toner and forming an image of information indicated by the attribute data on the transfer material in a manner superimposed on the image using clear-toner;
performing control such that the first image data and the second image data are recorded as history information on a job processed by the image processing apparatus; and
selecting one of:
a mode for synthesizing the first image data and the second image data and recording the synthesized image data, and
a mode for separately recording the first image data and the second image data without synthesizing the first image data and the second image data.

* * * * *